(12) United States Patent
Al-Ali et al.

(10) Patent No.: US 12,507,952 B2
(45) Date of Patent: Dec. 30, 2025

(54) OPTICAL PHYSIOLOGICAL NOSE SENSOR

(71) Applicant: MASIMO CORPORATION, Irvine, CA (US)

(72) Inventors: Ammar Al-Ali, San Juan Capistrano, CA (US); Stephen Scruggs, Newport Beach, CA (US); Kyla Scott Kotcherha, Huntington Beach, CA (US); Sujin Hwang, Irvine, CA (US)

(73) Assignee: MASIMO CORPORATION, Irvine, CA (US)

(*) Notice: Subject to any disclaimer, the term of this patent is extended or adjusted under 35 U.S.C. 154(b) by 823 days.

(21) Appl. No.: 17/662,729

(22) Filed: May 10, 2022

(65) Prior Publication Data

US 2022/0361819 A1  Nov. 17, 2022

Related U.S. Application Data

(60) Provisional application No. 63/193,415, filed on May 26, 2021, provisional application No. 63/187,071, filed on May 11, 2021.

(51) Int. Cl.
*A61B 5/00* (2006.01)
*A61B 5/024* (2006.01)
*A61B 5/026* (2006.01)

(52) U.S. Cl.
CPC ........ *A61B 5/6819* (2013.01); *A61B 5/02438* (2013.01); *A61B 5/0261* (2013.01)

(58) Field of Classification Search
CPC . A61B 5/6819; A61B 5/02438; A61B 5/0261; A61B 2562/164; A61B 2562/0238; A61B 5/14552
See application file for complete search history.

(56) References Cited

U.S. PATENT DOCUMENTS

| 4,543,146 A | 9/1985 | Petcen |
| 4,685,464 A | 8/1987 | Goldberger et al. |

(Continued)

FOREIGN PATENT DOCUMENTS

| CN | 112120710 A | * 12/2020 | ........... A61B 5/0059 |
| WO | WO 93/005710 | 4/1993 | |

(Continued)

OTHER PUBLICATIONS

US 2022/0192529 A1, 06/2022, Al-Ali et al. (withdrawn)

(Continued)

*Primary Examiner* — Abid A Mustansir
(74) *Attorney, Agent, or Firm* — KNOBBE, MARTENS, OLSON & BEAR, LLP

(57) ABSTRACT

An optical physiological sensor configured to be secured to a user's nose includes a first prong configured to be positioned proximate an outside portion of the nose, a second prong configured to be positioned proximate an inside portion of the user's nose, a winged portion coupled to the first prong and configured to contact tissue of the user, one or more emitters configured to emit light of one or more wavelengths into the tissue, and one or more detectors configured to detect at least a portion of the light emitted from the one or more emitters after attenuation through at least a portion of the tissue. In some configurations, the winged portion comprises a width that is greater than a width of the second prong. In some configurations, at least a portion of the winged portion is curved toward the second prong.

15 Claims, 13 Drawing Sheets

(56) References Cited

U.S. PATENT DOCUMENTS

| | | | |
|---|---|---|---|
| 4,960,128 A | 10/1990 | Gordon et al. | |
| 4,964,408 A | 10/1990 | Hink et al. | |
| 5,190,048 A | 3/1993 | Wilkinson | |
| 5,247,931 A | 9/1993 | Norwood | |
| 5,319,355 A | 6/1994 | Russek | |
| 5,335,659 A * | 8/1994 | Pologe | A61B 5/6819 128/207.18 |
| 5,337,744 A | 8/1994 | Branigan | |
| 5,341,805 A | 8/1994 | Stavridi et al. | |
| D353,195 S | 12/1994 | Savage et al. | |
| D353,196 S | 12/1994 | Savage et al. | |
| 5,377,676 A | 1/1995 | Vari et al. | |
| 5,383,469 A | 1/1995 | Vreman et al. | |
| D359,546 S | 6/1995 | Savage et al. | |
| 5,431,170 A | 7/1995 | Mathews | |
| 5,436,499 A | 7/1995 | Namavar et al. | |
| D361,840 S | 8/1995 | Savage et al. | |
| D362,063 S | 9/1995 | Savage et al. | |
| D363,120 S | 10/1995 | Savage et al. | |
| 5,456,252 A | 10/1995 | Vari et al. | |
| 5,479,934 A | 1/1996 | Imran | |
| 5,482,036 A | 1/1996 | Diab et al. | |
| 5,494,043 A | 2/1996 | O'Sullivan et al. | |
| 5,533,511 A | 7/1996 | Kaspari et al. | |
| 5,551,423 A | 9/1996 | Sugiura | |
| 5,561,275 A | 10/1996 | Savage et al. | |
| 5,590,649 A | 1/1997 | Caro et al. | |
| 5,602,924 A | 2/1997 | Durand et al. | |
| 5,638,816 A | 6/1997 | Kiani-Azarbayjany et al. | |
| 5,638,818 A | 6/1997 | Diab et al. | |
| 5,645,440 A | 7/1997 | Tobler et al. | |
| 5,671,914 A | 9/1997 | Kalkhoran et al. | |
| 5,726,440 A | 3/1998 | Kalkhoran et al. | |
| D393,830 S | 4/1998 | Tobler et al. | |
| 5,743,262 A | 4/1998 | Lepper, Jr. et al. | |
| 5,747,806 A | 5/1998 | Khalil et al. | |
| 5,750,994 A | 5/1998 | Schlager | |
| 5,758,644 A | 6/1998 | Diab et al. | |
| 5,760,910 A | 6/1998 | Lepper, Jr. et al. | |
| 5,810,724 A | 9/1998 | Gronvall | |
| 5,890,929 A | 4/1999 | Mills et al. | |
| 5,919,134 A | 7/1999 | Diab | |
| 5,987,343 A | 11/1999 | Kinast | |
| 5,997,343 A | 12/1999 | Mills et al. | |
| 6,002,952 A | 12/1999 | Diab et al. | |
| 6,010,937 A | 1/2000 | Karam et al. | |
| 6,027,452 A | 2/2000 | Flaherty et al. | |
| 6,040,578 A | 3/2000 | Malin et al. | |
| 6,066,204 A | 5/2000 | Haven | |
| 6,115,621 A | 9/2000 | Chin | |
| 6,115,673 A | 9/2000 | Malin et al. | |
| 6,124,597 A | 9/2000 | Shehada et al. | |
| 6,128,521 A | 10/2000 | Marro et al. | |
| 6,129,675 A | 10/2000 | Jay | |
| 6,144,868 A | 11/2000 | Parker | |
| 6,152,754 A | 11/2000 | Gerhardt et al. | |
| 6,184,521 B1 | 2/2001 | Coffin, IV et al. | |
| 6,232,609 B1 | 5/2001 | Snyder et al. | |
| 6,241,683 B1 | 6/2001 | Macklem et al. | |
| 6,253,097 B1 | 6/2001 | Aronow et al. | |
| 6,255,708 B1 | 7/2001 | Sudharsanan et al. | |
| 6,280,381 B1 | 8/2001 | Malin et al. | |
| 6,285,896 B1 | 9/2001 | Tobler et al. | |
| 6,308,089 B1 | 10/2001 | von der Ruhr et al. | |
| 6,317,627 B1 | 11/2001 | Ennen et al. | |
| 6,321,100 B1 | 11/2001 | Parker | |
| 6,334,065 B1 | 12/2001 | Al-Ali et al. | |
| 6,360,114 B1 | 3/2002 | Diab et al. | |
| 6,368,283 B1 | 4/2002 | Xu et al. | |
| 6,411,373 B1 | 6/2002 | Garside et al. | |
| 6,415,167 B1 | 7/2002 | Blank et al. | |
| 6,430,437 B1 | 8/2002 | Marro | |
| 6,430,525 B1 | 8/2002 | Weber et al. | |
| 6,463,311 B1 | 10/2002 | Diab | |
| 6,470,199 B1 | 10/2002 | Kopotic et al. | |
| 6,487,429 B2 | 11/2002 | Hockersmith et al. | |
| 6,505,059 B1 | 1/2003 | Kollias et al. | |
| 6,525,386 B1 | 2/2003 | Mills et al. | |
| 6,526,300 B1 | 2/2003 | Kiani et al. | |
| 6,534,012 B1 | 3/2003 | Hazen et al. | |
| 6,535,714 B2 | 3/2003 | Melker et al. | |
| 6,542,764 B1 | 4/2003 | Al-Ali et al. | |
| 6,580,086 B1 | 6/2003 | Schulz et al. | |
| 6,584,336 B1 | 6/2003 | Ali et al. | |
| 6,587,196 B1 | 7/2003 | Stippick et al. | |
| 6,587,199 B1 | 7/2003 | Luu | |
| 6,595,316 B2 | 7/2003 | Cybulski et al. | |
| 6,597,932 B2 | 7/2003 | Tian et al. | |
| 6,606,511 B1 | 8/2003 | Ali et al. | |
| 6,635,559 B2 | 10/2003 | Greenwald et al. | |
| 6,639,668 B1 | 10/2003 | Trepagnier | |
| 6,640,116 B2 | 10/2003 | Diab | |
| 6,640,117 B2 | 10/2003 | Makarewicz et al. | |
| 6,658,276 B2 | 12/2003 | Kiani et al. | |
| 6,661,161 B1 | 12/2003 | Lanzo et al. | |
| 6,697,656 B1 | 2/2004 | Al-Ali | |
| 6,697,658 B2 | 2/2004 | Al-Ali | |
| RE38,476 E | 3/2004 | Diab et al. | |
| RE38,492 E | 4/2004 | Diab et al. | |
| 6,738,652 B2 | 5/2004 | Mattu et al. | |
| 6,760,607 B2 | 7/2004 | Al-Ali | |
| 6,788,965 B2 | 9/2004 | Ruchti et al. | |
| 6,816,241 B2 | 11/2004 | Grubisic | |
| 6,822,564 B2 | 11/2004 | Al-Ali | |
| 6,850,787 B2 | 2/2005 | Weber et al. | |
| 6,850,788 B2 | 2/2005 | Al-Ali | |
| 6,876,931 B2 | 4/2005 | Lorenz et al. | |
| 6,909,912 B2 | 6/2005 | Melker | |
| 6,920,345 B2 | 7/2005 | Al-Ali et al. | |
| 6,934,570 B2 | 8/2005 | Kiani et al. | |
| 6,943,348 B1 | 9/2005 | Coffin, IV | |
| 6,956,649 B2 | 10/2005 | Acosta et al. | |
| 6,961,598 B2 | 11/2005 | Diab | |
| 6,970,792 B1 | 11/2005 | Diab | |
| 6,985,764 B2 | 1/2006 | Mason et al. | |
| 6,990,364 B2 | 1/2006 | Ruchti et al. | |
| 6,998,247 B2 | 2/2006 | Monfre et al. | |
| 7,003,338 B2 | 2/2006 | Weber et al. | |
| 7,015,451 B2 | 3/2006 | Dalke et al. | |
| 7,024,235 B2 | 4/2006 | Melker et al. | |
| 7,027,849 B2 | 4/2006 | Al-Ali | |
| D526,719 S | 8/2006 | Richie, Jr. et al. | |
| 7,096,052 B2 | 8/2006 | Mason et al. | |
| 7,096,054 B2 | 8/2006 | Abdul-Hafiz et al. | |
| D529,616 S | 10/2006 | Deros et al. | |
| 7,127,278 B2 | 10/2006 | Melker et al. | |
| 7,133,710 B2 | 11/2006 | Acosta et al. | |
| 7,142,901 B2 | 11/2006 | Kiani et al. | |
| 7,225,006 B2 | 5/2007 | Al-Ali et al. | |
| RE39,672 E | 6/2007 | Shehada et al. | |
| 7,254,429 B2 | 8/2007 | Schurman et al. | |
| 7,254,431 B2 | 8/2007 | Al-Ali et al. | |
| 7,254,434 B2 | 8/2007 | Schulz et al. | |
| 7,274,955 B2 | 9/2007 | Kiani et al. | |
| D554,263 S | 10/2007 | Al-Ali et al. | |
| 7,280,858 B2 | 10/2007 | Al-Ali et al. | |
| 7,289,835 B2 | 10/2007 | Mansfield et al. | |
| 7,292,883 B2 | 11/2007 | De Felice et al. | |
| 7,313,425 B2 | 12/2007 | Finarov et al. | |
| 7,341,559 B2 | 3/2008 | Schulz et al. | |
| 7,343,186 B2 | 3/2008 | Lamego et al. | |
| D566,282 S | 4/2008 | Al-Ali et al. | |
| 7,356,365 B2 | 4/2008 | Schurman | |
| 7,371,981 B2 | 5/2008 | Abdul-Hafiz | |
| 7,373,193 B2 | 5/2008 | Al-Ali et al. | |
| 7,377,794 B2 | 5/2008 | Al-Ali et al. | |
| 7,395,158 B2 | 7/2008 | Monfre et al. | |
| 7,415,297 B2 | 8/2008 | Al-Ali et al. | |
| 7,438,683 B2 | 10/2008 | Al-Ali et al. | |
| 7,483,729 B2 | 1/2009 | Al-Ali et al. | |
| D587,657 S | 3/2009 | Al-Ali et al. | |
| 7,500,950 B2 | 3/2009 | Al-Ali et al. | |
| 7,509,494 B2 | 3/2009 | Al-Ali | |
| 7,510,849 B2 | 3/2009 | Schurman et al. | |

(56) References Cited

U.S. PATENT DOCUMENTS

| | | |
|---|---|---|
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,785,262 B2 | 8/2010 | Melker et al. |
| 7,791,155 B2 | 9/2010 | Diab |
| 7,820,108 B2 | 10/2010 | Lampotang et al. |
| RE41,912 E | 11/2010 | Parker |
| 7,880,626 B2 | 2/2011 | Al-Ali et al. |
| 7,887,502 B2 | 2/2011 | Ross et al. |
| 7,909,772 B2 | 3/2011 | Popov et al. |
| 7,914,460 B2 | 3/2011 | Melker et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| 8,073,518 B2 | 12/2011 | Chin |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,211,035 B2 | 7/2012 | Melker et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,279,063 B2 | 10/2012 | Wohltjen |
| 8,280,473 B2 | 10/2012 | Al-Ali |
| 8,281,787 B2 | 10/2012 | Burton |
| D670,396 S | 11/2012 | Doogan |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,444,570 B2 | 5/2013 | McGonigle et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| 8,525,666 B2 | 9/2013 | Melker et al. |
| 8,529,459 B2 | 9/2013 | Malker et al. |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,641,635 B2 | 2/2014 | Melker et al. |
| 8,652,060 B2 | 2/2014 | Al-Ali |
| 8,666,468 B1 | 3/2014 | Ai-Ali |
| 8,670,811 B2 | 3/2014 | O'Reilly |
| 8,679,028 B2 | 3/2014 | Melker et al. |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,740,808 B2 | 6/2014 | Curti et al. |
| 8,755,535 B2 | 6/2014 | Telfort et al. |
| 8,755,857 B2 | 6/2014 | Melker et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,801,620 B2 | 8/2014 | Melker et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| D717,192 S | 11/2014 | Tanner et al. |
| 8,897,847 B2 | 11/2014 | Al-Ali |
| 8,897,850 B2 | 11/2014 | Jochim et al. |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,155,826 B2 | 10/2015 | Ross et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,198,586 B2 | 12/2015 | Melker |
| 9,211,095 B1 | 12/2015 | Al-Ali |
| 9,218,454 B2 | 12/2015 | Kiani et al. |
| D748,274 S | 1/2016 | Rich et al. |
| 9,245,668 B1 | 1/2016 | Vo et al. |
| D748,774 S | 2/2016 | Caron |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |

(56) References Cited

U.S. PATENT DOCUMENTS

| | | |
|---|---|---|
| D755,392 S | 5/2016 | Hwang et al. |
| 9,326,712 B1 | 5/2016 | Kiani |
| 9,370,634 B2 | 6/2016 | Melker et al. |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 | 11/2016 | Olsen |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,668,661 B2 | 6/2017 | Melker et al. |
| 9,668,695 B2 | 6/2017 | Melker |
| 9,697,928 B2 | 7/2017 | Al-Ali et al. |
| 9,717,458 B2 | 8/2017 | Lamego et al. |
| 9,717,836 B2 | 8/2017 | Melker |
| 9,724,002 B2 | 8/2017 | Rich et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| D802,152 S | 11/2017 | Wakefield et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,950,112 B2 | 4/2018 | Melker et al. |
| 9,955,937 B2 | 5/2018 | Telfort |
| 9,965,946 B2 | 5/2018 | Al-Ali et al. |
| 9,974,479 B2 | 5/2018 | Melker |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| D844,793 S | 4/2019 | Dai |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| 10,390,715 B2 | 8/2019 | Rich et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| RE47,882 E | 3/2020 | Al-Ali |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D916,291 S | 4/2021 | Fernando |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |

(56) References Cited

U.S. PATENT DOCUMENTS

| | | |
|---|---|---|
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| D967,966 S | 10/2022 | Siddiqui et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D972,151 S | 12/2022 | Durrer |
| D972,737 S | 12/2022 | Lewis, Jr. |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D974,569 S | 1/2023 | Smith et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D994,130 S | 8/2023 | Yi |
| D997,365 S | 8/2023 | Hwang |
| 11,721,105 B2 | 8/2023 | Ranasinghe et al. |
| 11,730,379 B2 | 8/2023 | Ahmed et al. |
| D997,938 S | 9/2023 | Aki |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| D999,652 S | 9/2023 | Schulz |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,015,325 S | 2/2024 | Zeng |
| D1,015,544 S | 2/2024 | Tsai |
| D1,017,051 S | 3/2024 | Fang |
| D1,022,729 S | 4/2024 | Forrest et al. |
| D1,025,372 S | 4/2024 | Albert |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,035,017 S | 7/2024 | Zhang |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,061,903 S | 2/2025 | Saito |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin |
| D1,066,244 S | 3/2025 | Lim et al. |
| D1,066,672 S | 3/2025 | Al-Ali et al. |
| D1,068,656 S | 4/2025 | Trevisan et al. |
| D1,071,195 S | 4/2025 | Seung |
| D1,072,836 S | 4/2025 | Indorf |
| D1,072,837 S | 4/2025 | Ahmed et al. |
| 12,272,445 B1 | 4/2025 | Kiani |
| D1,078,689 S | 6/2025 | Hwang |
| D1,079,020 S | 6/2025 | Hwang |
| 12,336,796 B2 | 6/2025 | Al-Ali |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2003/0236452 A1* | 12/2003 | Melker ............. A61B 5/14551 600/323 |
| 2004/0106163 A1 | 6/2004 | Workman, Jr. et al. |
| 2004/0230108 A1 | 11/2004 | Melker et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0032711 A1 | 2/2007 | Coakley |
| 2007/0073116 A1 | 3/2007 | Kiani et al. |
| 2007/0078315 A1 | 4/2007 | Kling et al. |
| 2007/0180140 A1 | 8/2007 | Welch et al. |
| 2007/0244377 A1 | 10/2007 | Cozad et al. |
| 2007/0260131 A1* | 11/2007 | Chin ............... A61B 5/14552 600/323 |
| 2008/0064965 A1 | 3/2008 | Jay et al. |
| 2008/0092898 A1 | 4/2008 | Schneider et al. |
| 2008/0094228 A1 | 4/2008 | Welch et al. |
| 2008/0103375 A1 | 5/2008 | Kiani |
| 2008/0221418 A1 | 9/2008 | Al-Ali et al. |

(56) References Cited

U.S. PATENT DOCUMENTS

| | | |
|---|---|---|
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0085527 A1 | 4/2010 | Konuma et al. |
| 2010/0085537 A1 | 4/2010 | Ramella-Roman et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2011/0227740 A1 | 9/2011 | Wohltjen |
| 2011/0230733 A1 | 9/2011 | Al-Ali |
| 2012/0078069 A1 | 3/2012 | Melker |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0272963 A1 | 11/2012 | Thomas et al. |
| 2012/0283524 A1 | 11/2012 | Kiani et al. |
| 2013/0023775 A1 | 1/2013 | Lamego et al. |
| 2013/0041591 A1 | 2/2013 | Lamego |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0005557 A1* | 1/2014 | Rich .................. A61B 5/14552 600/479 |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0275887 A1 | 9/2014 | Batchelder et al. |
| 2014/0275930 A1 | 9/2014 | Rich et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2014/0343382 A1 | 11/2014 | Kersey et al. |
| 2015/0005600 A1 | 1/2015 | Blank et al. |
| 2015/0011907 A1 | 1/2015 | Purdon et al. |
| 2015/0073233 A1 | 3/2015 | Rich et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2015/0105632 A1 | 4/2015 | Melker et al. |
| 2015/0297137 A1 | 10/2015 | Welch et al. |
| 2015/0342480 A1 | 12/2015 | Justice et al. |
| 2015/0351688 A1 | 12/2015 | Just et al. |
| 2016/0174855 A1 | 6/2016 | Deliwala |
| 2016/0196388 A1 | 7/2016 | Lamego |
| 2016/0283665 A1 | 9/2016 | Sampath et al. |
| 2016/0367173 A1 | 12/2016 | Dalvi et al. |
| 2017/0024748 A1 | 1/2017 | Haider |
| 2017/0173632 A1 | 6/2017 | Al-Ali |
| 2017/0251974 A1 | 9/2017 | Shreim et al. |
| 2017/0311891 A1 | 11/2017 | Kiani et al. |
| 2018/0192953 A1* | 7/2018 | Shreim .............. A61B 5/14532 |
| 2018/0242926 A1 | 8/2018 | Muhsin et al. |
| 2018/0247353 A1 | 8/2018 | Al-Ali et al. |
| 2018/0247712 A1 | 8/2018 | Muhsin et al. |
| 2018/0256087 A1 | 9/2018 | Al-Ali et al. |
| 2018/0296161 A1* | 10/2018 | Shreim .............. A61B 5/02438 |
| 2018/0310823 A1 | 11/2018 | Al-Ali et al. |
| 2019/0117070 A1 | 4/2019 | Muhsin et al. |
| 2019/0239787 A1 | 8/2019 | Pauley et al. |
| 2019/0320906 A1 | 10/2019 | Olsen |
| 2019/0374713 A1 | 12/2019 | Kiani et al. |
| 2020/0060869 A1 | 2/2020 | Telfort et al. |
| 2020/0111552 A1 | 4/2020 | Ahmed |
| 2020/0113435 A1 | 4/2020 | Muhsin |
| 2020/0113488 A1 | 4/2020 | Al-Ali et al. |
| 2020/0113496 A1 | 4/2020 | Scruggs et al. |
| 2020/0113497 A1 | 4/2020 | Triman et al. |
| 2020/0113520 A1 | 4/2020 | Abdul-Hafiz et al. |
| 2020/0138288 A1 | 5/2020 | Al-Ali et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0379059 A1 | 12/2022 | Yu et al. |
| 2022/0392610 A1 | 12/2022 | Kiani et al. |
| 2023/0012758 A1 | 1/2023 | Finean et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0078479 A1 | 3/2023 | Tsai et al. |
| 2023/0087671 A1 | 3/2023 | Telfort et al. |
| 2023/0107113 A1 | 4/2023 | Sonnon et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |

(56) References Cited

U.S. PATENT DOCUMENTS

| | | |
|---|---|---|
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0252046 A1 | 8/2024 | Jansen et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Ai-All |
| 2024/0298920 A1 | 9/2024 | Fernkbist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |
| 2025/0100482 A1 | 3/2025 | Al-Ali et al. |
| 2025/0118415 A1 | 4/2025 | Olsen |

FOREIGN PATENT DOCUMENTS

| | | |
|---|---|---|
| WO | WO 96/013208 | 5/1996 |
| WO | WO 2005/065540 | 7/2005 |
| WO | WO 2018/194992 | 10/2018 |
| WO | WO 2022/240765 | 11/2022 |

OTHER PUBLICATIONS

US 2024/0016391 A1, 01/2024, Lapotko et al. (withdrawn)
International Search Report and Written Opinion received in PCT Application No. PCT/US2022/028366, dated Sep. 14, 2022.
International Search Report and Written Opinion received in PCT Application No. PCT/US2018/027833, dated Jul. 5, 2018.
International Preliminary Report on Patentability and Written Opinion received in PCT Application No. PCT/US2018/027833, dated Oct. 31, 2019.

* cited by examiner

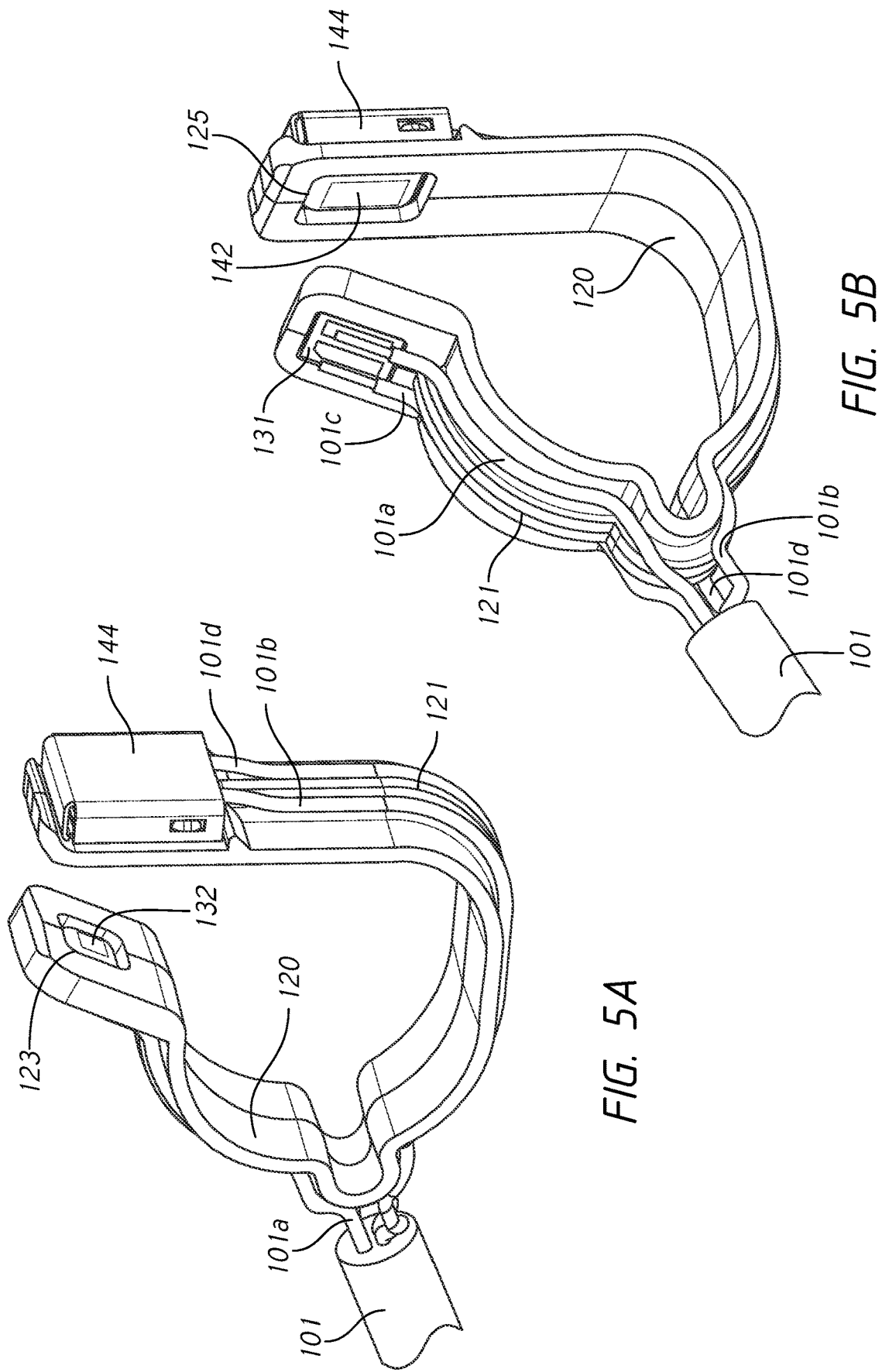

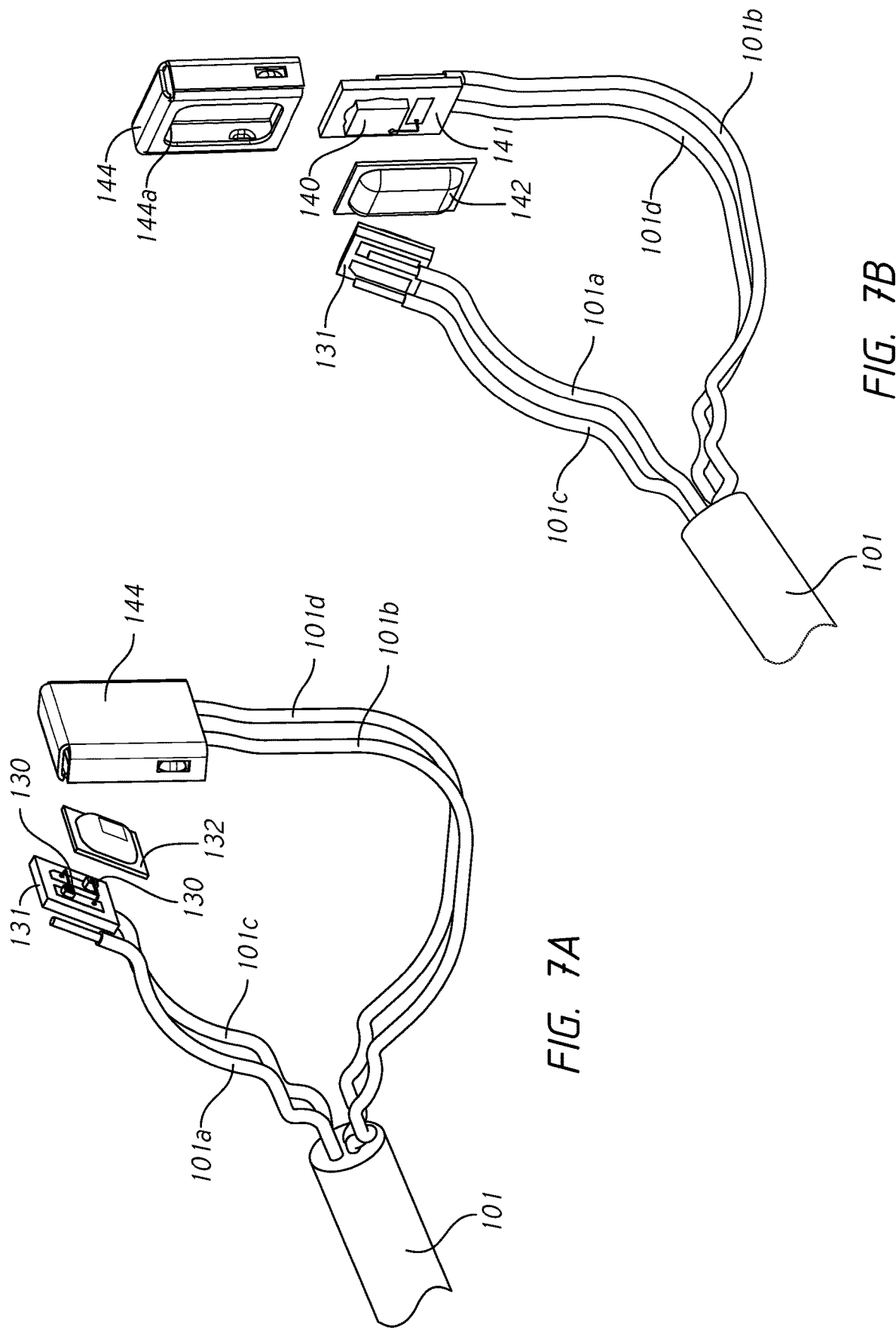

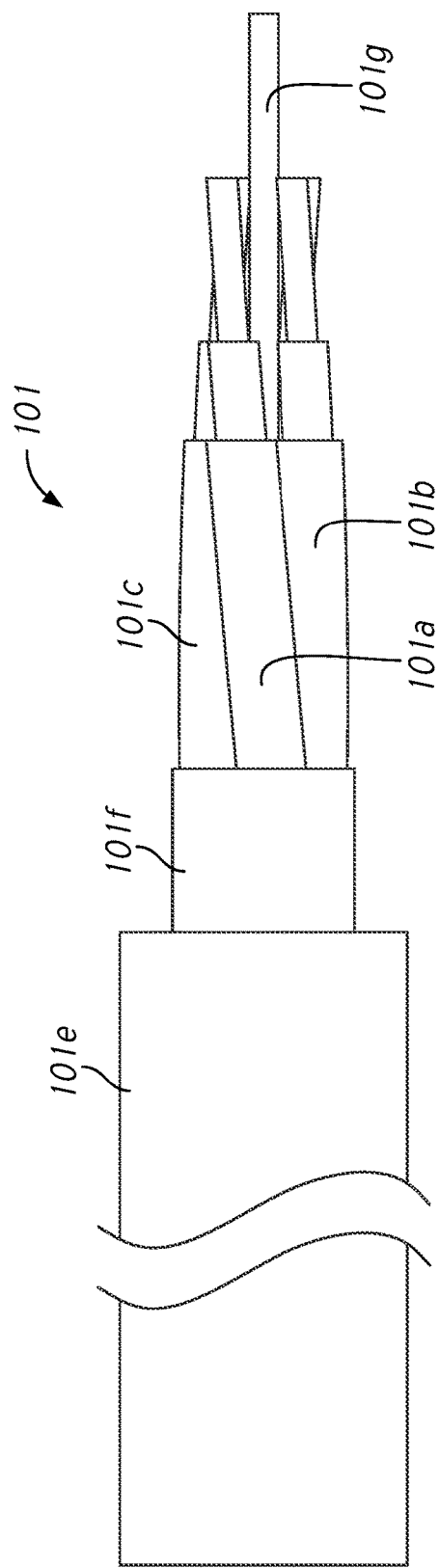
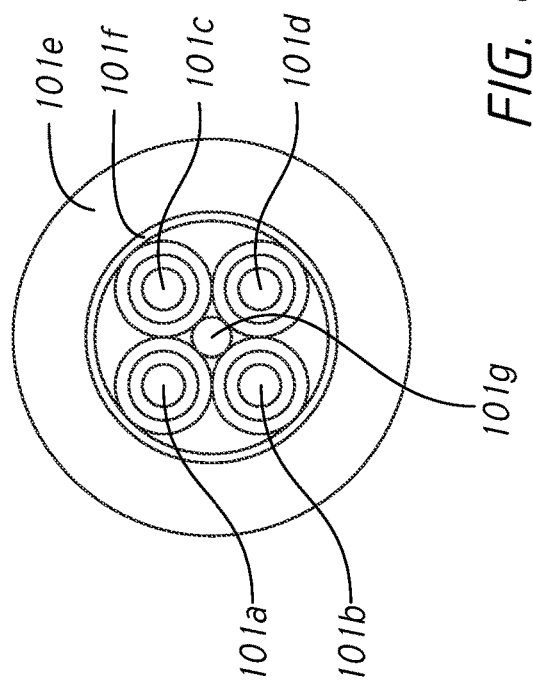
FIG. 8A
FIG. 8B

OPTICAL PHYSIOLOGICAL NOSE SENSOR

INCORPORATION BY REFERENCE TO ANY PRIORITY APPLICATIONS

The present application claims priority to U.S. Provisional Application No. 63/193,415, filed May 26, 2021, titled "Optical Physiological Nose Sensor", and U.S. Provisional Application No. 63/187,071, filed May 11, 2021, titled "Optical Physiological Nose Sensor", each of which is hereby incorporated by reference in its entirety. All of the above-listed applications and any and all other applications for which a foreign or domestic priority claim is identified in the Application Data Sheet as filed with the present application, are hereby incorporated by reference under 37 CFR 1.57.

TECHNICAL FIELD

The present disclosure relates to physiological sensors for measuring and/or monitoring a subject's physiological information.

BACKGROUND

Hospitals, nursing homes, and other patient care facilities typically include patient monitoring devices at one or more bedsides in the facility. Patient monitoring devices generally include sensors, processing equipment, and displays for obtaining and analyzing a medical subject's physiological parameters such as blood oxygen saturation level, respiratory rate, pulse, and other parameters, such as those monitored on commercially available patient monitors from Masimo Corporation of Irvine, California Clinicians, including doctors, nurses, and other medical personnel, use the physiological parameters and trends of those parameters obtained from patient monitors to diagnose illnesses and to prescribe treatments. Clinicians also use the physiological parameters to monitor patients during various clinical situations to determine whether to increase the level of medical care given to patients.

SUMMARY

Examples of non-invasive patient monitoring devices include pulse oximeters. Pulse oximetry is a widely accepted noninvasive procedure for measuring the oxygen saturation level of arterial blood, an indicator of a person's oxygen supply. A pulse oximeter generally includes one or more light sources transmitting optical radiation into or reflecting off through a portion of the body. After attenuation by tissue and fluids of the portion of the body, one or more photodetection devices detect the attenuated light and output one or more detector signals responsive to the detected attenuated light. The oximeter may be utilized for determination of a variety of physiological parameters and/or characteristics, including but not limited to oxygen saturation ($SpO_2$), pulse rate, a plethysmograph waveform, perfusion index (PI), pleth variability index (PVI), methemoglobin (MetHb), carboxyhemoglobin (CoHb), total hemoglobin (tHb), glucose, and/or otherwise, and the oximeter may be utilize for display on one or more monitors the foregoing parameters individually, in groups, in trends, as combinations, or as an overall wellness or other index. An example of such an oximeter, which can utilize an optical sensor described herein, are described in U.S. application Ser. No. 13/762,270, filed Feb. 7, 2013, titled "Wireless Patient Monitoring Device," U.S. application Ser. No. 14/834,169, filed Aug. 24, 2015, titled "Wireless Patient Monitoring Device," and U.S. application Ser. No. 14/511,974, filed Oct. 10, 2014, titled "Patient Position Detection System," the disclosures of which are hereby incorporated by reference in their entireties. Other examples of such oximeters are described in U.S. application Ser. No. 09/323,176, filed May 27, 1999, titled "Stereo Pulse Oximeter," now U.S. Pat. No. 6,334,065, the disclosure of which is hereby incorporated by reference in its entirety.

In some circumstances, it can be advantageous to select a nose or nasal region as a site for pulse oximetry. The present disclosure describes various embodiments of physiological sensors which secure to a user's nose and employ pulse oximetry. Various embodiments disclosed herein provide increased user comfort, facilitate better sensor-skin contact and engagement in order to provide more accurate physiological parameter determination, and provide better stability in securement.

An optical physiological sensor configured to be secured to a nose of a user can include: a first prong comprising a free end configured to be positioned proximate an outside portion of the user's nose when the optical physiological sensor is in use; a second prong coupled to the first prong and comprising a free end, wherein the free end of the second prong is configured to be positioned proximate an inside portion of the user's nose when the optical physiological sensor is in use; a winged portion coupled to the free end of the first prong and configured to contact tissue of the user when the optical physiological sensor is in use, wherein the winged portion comprises a width that is greater than a width of the free end of the second prong and wherein at least a portion of the winged portion is curved toward the second prong, thereby allowing the winged portion to conform to the outside portion of the user's nose when the optical physiological sensor is in use; one or more emitters positioned proximate to the free end of the first prong and configured to emit light of one or more wavelengths into the tissue of the user when the optical physiological sensor is in use; and one or more detectors positioned proximate to the free end of the second prong and configured to detect at least a portion of the light emitted from the one or more emitters after attenuation through at least a portion of the tissue of the user's nose.

In some configurations, the winged portion comprises a first wing, a second wing, and an intermediate portion connecting and positioned between the first and second wings. In some configurations, said width of the winged portion extends between a first end of the first wing and a second end of the second wing. In some configurations, said first wing is curved toward the second prong. In some configurations, said second wing is curved toward the second prong. In some configurations, said intermediate portion is not curved. In some configurations, said intermediate portion defines a flat surface. In some configurations, said first wing comprises a width that is approximately equal to a width of said second wing. In some configurations, each of said first and second wing comprises a width that is less than said width of said free end of said second prong. In some configurations, each of said first and second wing comprises a width that is less than a width of said intermediate portion. In some configurations, said width of said winged portion extends between opposite ends of said winged portion, and wherein said opposite ends are rounded. In some configurations, said width of the winged portion is greater than a width of the first prong. In some configurations, a ratio between said width of the winged portion and said width of the free end of the second prong is between approximately 1 and approximately 5. In some configurations, a ratio between said width of the winged portion and said width of the free end of the second prong is between approximately 2 and approximately 4. In some configurations, said winged portion comprises a height that is less than the width of said winged portion. In some configurations, said winged portion comprises a height, and wherein a ratio between said height and said width of the winged portion is between approximately 1 and approximately 3.

In some configurations, the optical physiological sensor further comprises a coupling portion connecting and positioned between said first and second prongs. In some configurations, said coupling portion is curved. In some configurations: said optical physiological sensor is configured to be in a first position and a second position; said first prong extends from said coupling portion along a first axis and said second prong extends from said coupling portion along a second axis; and when said optical physiological sensor is in said first position, said first and second axes are nonparallel with respect to one another. In some configurations, when said optical physiological sensor is in said first position, an angle between said first and second axes is between approximately 0° and approximately 90°. In some configurations, when said optical physiological sensor is in said first position, an angle between said first and second axes is between approximately 10° and approximately 60°. In some configurations, when said optical physiological sensor is in said second position, said first and second axes are nonparallel with respect to one another. In some configurations, an angle between said first and second axes is greater when said optical physiological sensor is in said first position than when said optical physiological sensor is in said second position. In some configurations, said first prong extends from said coupling portion and is curved at least partially toward the second prong and wherein said second prong extends from said coupling portion and is straight.

In some configurations, the optical physiological sensor further comprises a housing, wherein the first and second prongs and winged portion are at least partially defined by the housing. In some configurations, said housing comprises a soft material. In some configurations, said housing comprises silicone. In some configurations, the one or more emitters and one or more detectors are positioned within an interior of the housing. In some configurations: said housing comprises a first opening into said interior and a second opening into said interior, said first opening located on the winged portion and said second opening located proximate the free end of the second prong; said first opening is configured to allow the emitted light from the one or more emitters to pass through the housing and toward said at least the portion of the tissue of the user's nose; and said second opening is configured to allow said at least the portion of the light emitted from the one or more emitters to pass to the one or more detectors after attenuation through said at least the portion of the tissue. In some configurations, said first opening is smaller than said second opening. In some configurations, the optical physiological sensor further comprises an optical transmission material positioned between said one or more emitters and said first opening. In some configurations, said optical transmission material comprises a lens configured to focus the light that passes through tissue towards the one or more detectors. In some configurations, said optical transmission material comprises a diffuser configured to spread the emitted light before the emitted light reaches the tissue. In some configurations, the optical physiological sensor further comprises an optical transmission material positioned between said one or more detectors and said second opening. In some configurations, said optical transmission material comprises a lens configured to focus the emitted light towards the tissue. In some configurations, the optical physiological sensor further comprises a first optical transmission material positioned between said one or more emitters and said first opening and a second optical transmission material positioned between said one or more detectors and said second opening. In some configurations, said first optical transmission material comprises a diffuser configured to spread the emitted light before the emitted light reaches the tissue and wherein said second optical transmission material comprises a lens configured to focus the emitted light towards the tissue.

In some configurations, the optical physiological sensor further comprises a detector shield positioned proximate the one or more detectors and within the interior of the housing, the detector shield configured to prevent light that has not attenuated through the tissue from reaching the one or more detectors.

In some configurations, the optical physiological sensor further comprises a biasing member positioned within the interior of the housing, wherein the biasing member is configured to flex between a first position and a second position when the optical physiological sensor is secured to the user's nose. In some configurations, said first position is associated is a neutral state of the physiological sensor. In some configurations, the biasing member is biased toward the first position. In some configurations, the biasing member comprises plastic. In some configurations, the biasing member comprises: a first end positioned adjacent the one or more emitters; a second end positioned adjacent to the one or more detectors; a first opening at the first end, the first opening configured to allow the emitted light from the one or more emitters to pass to the tissue; and a second opening at the second end, the second opening configured to allow the at least the portion of the light attenuated through the tissue to arrive at the one or more detectors.

In some configurations, the optical physiological sensor comprises a first position when not secured to the user's nose and a second position when secured to the user's nose, and wherein, the free ends of the first and second prongs are spaced from one another when the optical physiological sensor is in the first position. In some configurations, when said optical physiological sensor is in said first position, said optical physiological sensor is in an unstressed state, and wherein, when said optical physiological sensor is in said second position, said optical physiological sensor is in a stressed state.

In some configurations, the optical physiological sensor further comprises a cable configured to removably connect to a monitoring device. In some configurations, said one or more detectors are configured to generate at least one signal responsive to the detected at least the portion of the emitted light, and wherein said cable is configured to transmit said at least one signal to said monitoring device. In some configurations, the optical physiological sensor does not comprise a cable. In some configurations, the optical physiological sensor further comprises a power source. In some configurations, the optical physiological sensor is configured to wirelessly communicate with a monitoring device. In some configurations, said first and second prongs are nonparallel relative to one another.

In some configurations, the optical physiological sensor further comprises a coupling portion connecting and positioned between said first and second prongs. In some configurations, entire exterior portions of the first prong, second prong, and winged portion are defined by a single, contiguous housing. In some configurations, said housing comprises a soft material. In some configurations, said housing comprises silicone. In some configurations, the one or more emitters and one or more detectors are positioned within an interior of the housing. In some configurations, the optical physiological sensor further comprises a coupling portion connecting and positioned between said first and second prongs, wherein entire exterior portions of the first prong, second prong, coupling portion, and winged portion are defined by a single, contiguous housing. In some configurations, said housing comprises a soft material. In some configurations, said housing comprises silicone. In some configurations, the one or more emitters and one or more detectors are positioned within an interior of the housing.

A optical physiological sensor configured to be secured to a nose of a user can comprise: a first prong configured to be positioned proximate an outside portion of the user's nose when the optical physiological sensor is in use; a second prong coupled to the first prong and configured to be positioned proximate an inside portion of the user's nose when the optical physiological sensor is in use; a winged portion coupled to the first prong and configured to contact tissue of the user when the optical physiological sensor is in use, wherein the winged portion extends outward from the first prong and wherein at least a portion of the winged portion curves toward the second prong; one or more emitters positioned within the first prong and configured to emit light of one or more wavelengths into the tissue of the user when the optical physiological sensor is in use; and one or more detectors positioned within the second prong and configured to detect at least a portion of the light emitted from the one or more emitters after attenuation through at least a portion of the tissue of the user's nose.

In some configurations, each of the first and second prongs comprises a free end, and wherein the one or more emitters are positioned within the first prong proximate the free end of the first prong, and wherein the one or more detectors are positioned within the second prong proximate the free end of the second prong. In some configurations, the winged portion is coupled to and extends outward from a free end of the first prong. In some configurations, the winged portion comprises a width that is greater than a width of the second prong. In some configurations, the width of the winged portion is greater than a width of the second prong. In some configurations, said first and second prongs are non-parallel relative to one another.

In some configurations, the optical physiological sensor further comprises a coupling portion connecting and positioned between said first and second prongs. In some configurations, said first prong is curved and said second prong is straight. In some configurations, the winged portion comprises a first wing, a second wing, and an intermediate portion connecting and positioned between the first and second wings. In some configurations, a width of the winged portion extends between a first end of the first wing and a second end of the second wing. In some configurations, said first wing is curved toward the second prong. In some configurations, said second wing is curved toward the second prong. In some configurations, said intermediate portion is not curved. In some configurations, a ratio between a width of the winged portion and a width of the second prong is between approximately 1 and approximately 5. In some configurations, said winged portion comprises a height that is less than a width of said winged portion. In some configurations, said winged portion comprises a height and a width, and wherein a ratio between said height and said width of the winged portion is between approximately 1 and approximately 3.

In some configurations, the optical physiological sensor further comprises a coupling portion connecting and positioned between said first and second prongs, wherein said coupling portion is curved. In some configurations, the optical physiological sensor further comprises a housing, wherein the first and second prongs and winged portion are at least partially defined by the housing. In some configurations, said housing comprises a soft material. In some configurations, said housing comprises silicone. In some configurations, the one or more emitters and one or more detectors are positioned within an interior of the housing. In some configurations: said housing comprises a first opening into said interior and a second opening into said interior, said first opening located on the winged portion and said second opening located proximate the free end of the second prong; said first opening is configured to allow the emitted light from the one or more emitters to pass through the housing and toward said at least the portion of the tissue of the user's nose; and said second opening is configured to allow said at least the portion of the light emitted from the one or more emitters to pass to the one or more detectors after attenuation through said at least the portion of the tissue. In some configurations, said first opening is smaller than said second opening.

In some configurations, the optical physiological sensor further comprises a biasing member positioned within the interior of the housing, wherein the biasing member is configured to flex between a first position and a second position when the optical physiological sensor is secured to the user's nose. In some configurations, said first position is associated is a neutral state of the optical physiological sensor. In some configurations, the biasing member is biased toward the first position. In some configurations, the biasing member comprises plastic. In some configurations, the biasing member comprises: a first end positioned adjacent the one or more emitters; a second end positioned adjacent to the one or more detectors; a first opening at the first end, the first opening configured to allow the emitted light from the one or more emitters to pass to the tissue; and a second opening at the second end, the second opening configured to allow the at least the portion of the light attenuated through the tissue to arrive at the one or more detectors.

In some configurations, the optical physiological sensor comprises a first position when not secured to the user's nose and a second position when secured to the user's nose, and wherein, free ends of the first and second prongs are spaced from one another when the optical physiological sensor is in the first position. In some configurations, when said optical physiological sensor is in said first position, said optical physiological sensor is in an unstressed state, and wherein, when said optical physiological sensor is in said second position, said optical physiological sensor is in a stressed state.

An optical physiological sensor configured to be secured to a nose of a user can include: a first prong configured to be positioned proximate an outside portion of the user's nose when the optical physiological sensor is in use; a second prong coupled to the first prong and configured to be positioned proximate an inside portion of the user's nose when the optical physiological sensor is in use; a housing at least partially defining the first and second prongs, the housing comprising an interior; one or more emitters positioned within a portion of the interior of the housing and configured to emit light of one or more wavelengths into tissue of the user when the optical physiological sensor is in use; one or more detectors positioned within a portion of the interior of the housing and configured to detect at least a portion of the light emitted from the one or more emitters after said emitted light passes through at least a portion of the tissue of the user's nose; and a biasing member. The biasing member can be positioned within the interior of the housing and configured to provide rigidity to the physiological sensor. The biasing member can be configured to flex between a first position and a second position when the optical physiological sensor is secured to the user's nose. In some configurations, when the physiological sensor is assembled: no portion of the biasing member is exposed; and/or no portion of the biasing member is visible.

In some configurations, the housing comprises an open portion configured to allow at least the biasing member to be inserted into the interior of the housing when the optical physiological sensor is assembled, and the optical physiological sensor comprises a sealant covering said open portion. In some configurations, said sealant is a liquid sealant. In some configurations, said sealant comprises a color that is similar or identical to a color of the housing. In some configurations, said sealant forms a unitary structure with said housing. In some configurations, said open portion extends along the first and second prongs. In some configurations, when the optical physiological sensor is assembled, the housing covers an entirety of said biasing member. In some configurations, said biasing member comprises a dark color. In some configurations, said biasing member comprises black. In some configurations, said first position is a neutral state of the optical physiological sensor. In some configurations, the biasing member is biased toward the first position. In some configurations, the biasing member comprises plastic. In some configurations, the biasing member comprises a harder material than the housing. In some configurations, the biasing member comprises a more rigid material than the housing. In some configurations, the biasing member comprises a greater stiffness than the housing. In some configurations, the biasing member comprises: a first end positioned adjacent the one or more emitters; a second end positioned adjacent to the one or more detectors; a first opening at the first end, the first opening configured to allow the emitted light from the one or more emitters to pass to the tissue; and a second opening at the second end, the second opening configured to allow the at least the portion of the emitted light that passes through the at least the portion of the tissue to arrive at the one or more detectors.

For purposes of summarizing the disclosure, certain aspects, advantages and novel features of several embodiments have been described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Certain features of this disclosure are described below with reference to the drawings. The illustrated embodiments are intended to illustrate, but not to limit, the embodiments. Various features of the different disclosed embodiments can be combined to form further embodiments, which are part of this disclosure.

FIGS. 5A-5B illustrate a portion of the physiological sensor of FIG. 1A in accordance with aspects of this disclosure.

FIGS. 7A-7B illustrate a portion of the physiological sensor of FIG. 1A in accordance with aspects of this disclosure.

FIG. 8A illustrates an example cable according to some implementations of the physiological sensor of FIG. 1A in accordance with aspects of this disclosure.

FIG. 8B illustrates an example cross-section taken through the cable of FIG. 8A in accordance with aspects of this disclosure.

DETAILED DESCRIPTION

Various features and advantages of this disclosure will now be described with reference to the accompanying figures. The following description is merely illustrative in nature and is in no way intended to limit the disclosure, its application, or uses. This disclosure extends beyond the specifically disclosed embodiments and/or uses and obvious modifications and equivalents thereof. Thus, it is intended that the scope of this disclosure should not be limited by any particular embodiments described below. The features of the illustrated embodiments can be modified, combined, removed, and/or substituted as will be apparent to those of ordinary skill in the art upon consideration of the principles disclosed herein. Furthermore, embodiments disclosed herein can include several novel features, no single one of which is solely responsible for its desirable attributes or which is essential to practicing the systems, devices, and methods disclosed herein.

Disclosed herein are various implementations of physiological sensors that can be used to measure, monitor, and/or transmit (for example, wirelessly or via wired connection) one or more physiological parameters of a user. Various implementations of the disclosed physiological sensors can generate and transmit one or more signals associated with and/or indicative of one or more physiological parameters of a user to a separate monitoring device (for example, wirelessly or via wired connection), for example, a patient monitor which is capable of processing and/or determining such physiological parameters based on the transmitted signals. Implementations of the disclosed physiological sensors and/or monitoring devices in communication with the physiological sensors can include hardware and/or software capable of determining and/or monitoring a variety of physiological parameters, including but not limited to blood oxygenation levels in veins and/or arteries, heart rate, blood flow, respiratory rates, and/or other physiological parameters or characteristics such as those discussed herein. Implementations of the physiological sensors described herein can include and/or employ pulse oximetry, for example, an optical sensor to measure physiological parameters of the user and/or to generate and transmit one or more signals associated with and/or indicative of such physiological parameters. As discussed below, such optical sensor can include one or more emitters configured to emit light of one or more wavelengths and one or more detectors configured to detect at least a portion of the emitted light after attenuation through tissue of the user.

Figure 1A:
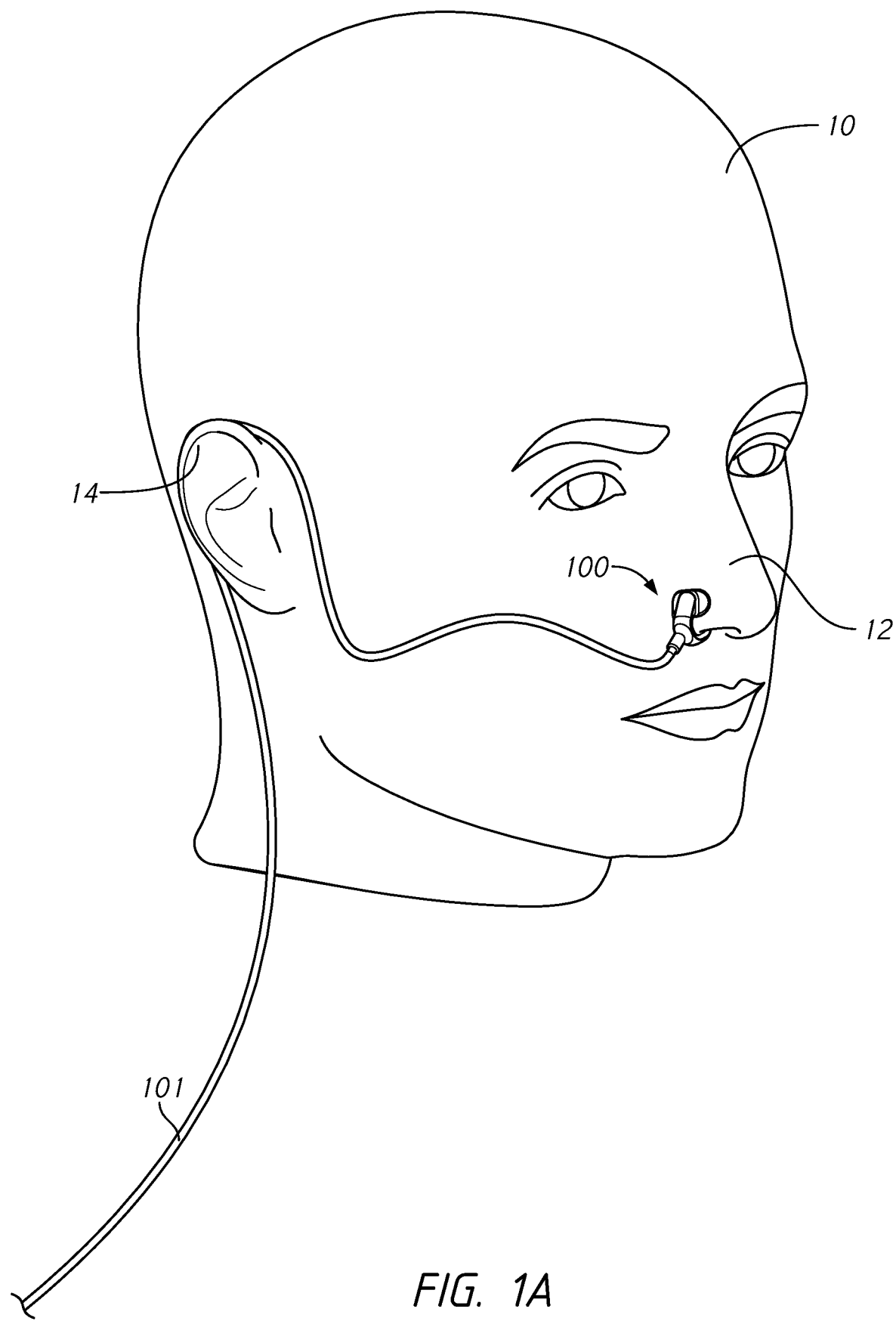
FIG. 1A illustrates a perspective view of a physiological sensor secured to a user's nose in accordance with aspects of this disclosure.
Figure 1B:
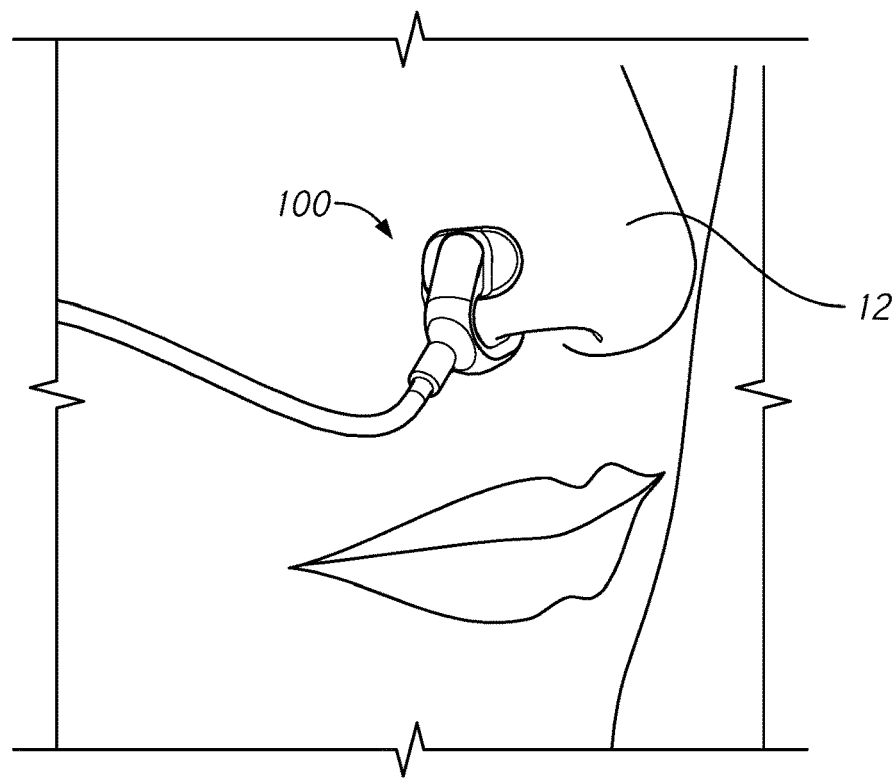
FIGS. 1B-1C illustrate additional views of the physiological sensor of FIG. 1A secured to the user's nose in accordance with aspects of this disclosure.
Figure 1C:
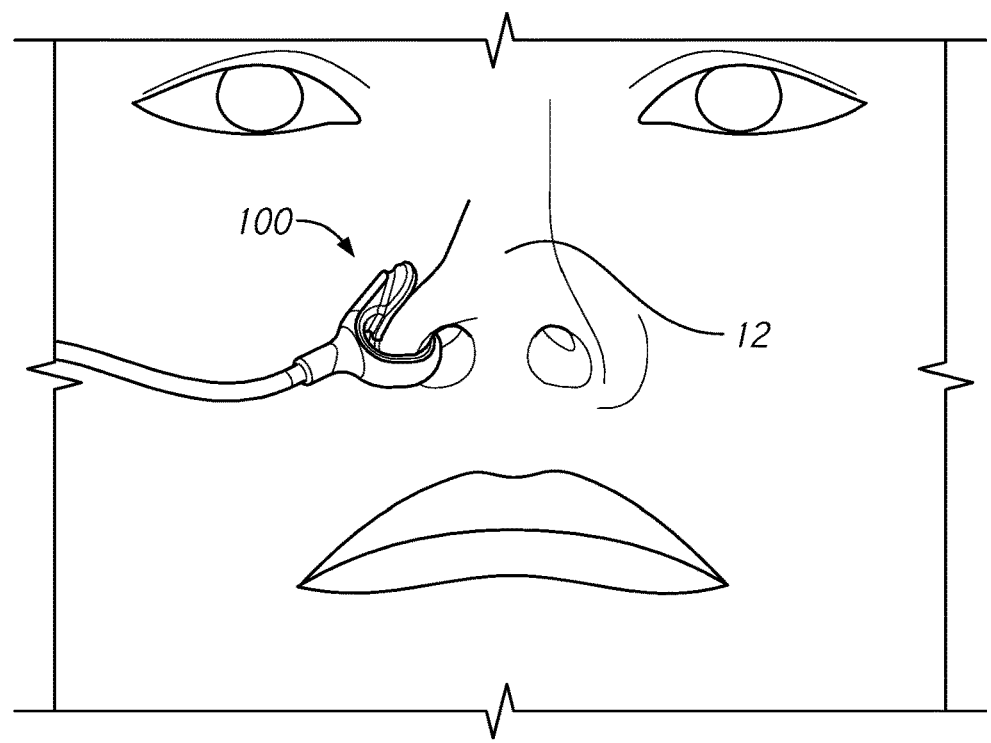

FIG. 1A illustrates a physiological sensor 100 (which may also be referred to herein as a "physiological monitoring device", "physiological measurement device") secured to a nose 12 of a user 10. FIGS. 1B-1C illustrate different enlarged views of physiological sensor 100 secured to the user's nose 12. More specifically, FIGS. 1A-1C illustrate physiological sensor 100 secured to the nose 12 such that a first portion of the physiological sensor 100 contacts an outer portion of the nose 12 (for example, an ala of the nose 12) and a second portion of the physiological sensor 100 contacts an inner portion of the nose 12 (for example, an interior surface within a nostril of the nose 12). As also shown, physiological sensor 100 can wrap around a portion of the nose 12 when secured thereto. For example, physiological sensor 100 can wrap around a portion of a nostril of the nose 12. As shown in FIGS. 1A-1C and as further discussed elsewhere herein, physiological sensor 100 can advantageously be sized and/or shaped to conform to one or more portions of the nose 12. Such configurations advantageously improve comfort to the user 10 as well as facilitate better skin-sensor interface to improve transmission and detection of light through tissue (for example, where sensor 100 includes emitter(s) and detector(s) such as those discussed herein), thereby increasing the accuracy of physiological parameter determination.

While FIGS. 1A-1C illustrate an example manner and placement by which physiological sensor 100 can be secured to the user's nose 12, such manner is not intended to be limiting. Physiological sensor 100 can be secured to various portions the user's nose 12 in a variety of manners and/or using a variety of methods. Additionally, in some cases, the physiological sensor 100 can be secured and/or placed adjacent to portions of a body of the user 10 other than the nose 12, such as an ear 14, finger, toe, among other regions of the user's body. Accordingly, while physiological sensor 100 is described herein primarily with reference to a nose and/or portions thereof, such description is not intended to be limiting, and the physiological sensor 100 can be utilized in connection with other portions of the user's body.

In some configurations and as illustrated in FIGS. 1A-1C, physiological sensor 100 can include and/or be coupled with a cable 101. Such cable 101 can allow physiological sensor 100 to connect (for example, removably connect) to a separate monitoring device and allow physiological sensor 100 to transmit determined physiological parameters and/or signal(s) generated by physiological sensor 100 associated with and/or indicative of physiological parameters. However, in alternative configurations, physiological sensor 100 does not include a cable, and in such alternative configurations, physiological sensor 100 can be configured to wirelessly communicate with one or more separate monitoring devices via a wireless communication protocol. Such wireless communication protocol can be any of a variety of communication protocols, including but not limited to Wi-Fi (802.11x), Bluetooth®, ZigBee®, Z-wave®, cellular telephony, infrared, RFID, satellite transmission, proprietary protocols, combinations of the same, among others. In such configurations, physiological sensor 100 can include a wireless transmitter or wireless transceiver configured for such wireless communication. In some configurations where physiological sensor 100 includes and/or is coupled with cable 101, physiological sensor 100 can receive power from an external power source, for example, of a separate monitoring device to which it connects, via cable 101. In some configurations, for example, where physiological sensor 100 does not include a cable, physiological sensor 100 can include a power source (such as a battery). In some configurations of the physiological sensor 100 which include and/or are coupled with cable 101, such cable 101 can advantageously be wrapped around a portion of an ear 14 (for example, a top portion of the ear 14) of the user 10 as shown in FIG. 1A. In some implementations, cable 101 is integrally formed with a portion of physiological sensor 100 (for example, at or near stem 108). However, in some variants, a portion of physiological sensor 100 is removably connectable to cable 101 which can provide power to physiological sensor 100, transmit instructions to physiological sensor 100 (for example, to drive emitter(s) of physiological sensor 100), and/or receive physiological data or signal(s) indicative of physiological data (for example, signal(s) from detector(s) of physiological sensor 100).

FIGS. 2A-2H illustrate various enlarged views of physiological sensor 100. Physiological sensor 100 can include one or more prongs configured to allow physiological sensor 100 to secure and/or be placed adjacent portions of the nose 12 of the user 10. For example, with reference to FIGS. 2E-2F, physiological sensor 100 can include two prongs, such as prong 102 and 104 discussed herein. In some configurations, physiological sensor 100 only includes prong 102 and 104 and does not include any other prongs. In such configurations, physiological sensor 100 does not include more than two prongs. Prongs 102, 104 can secure to outer and inner portions (for example, respectively) of the user's nose 12. Prongs 102, 104 can be coupled to one another, as shown. Prongs 102, 104 can be configured to flex toward and/or away from one another, for example, during securement to the user's nose 12. Prongs 102, 104 can be configured to move (for example, flex) between various positions with respect to one another. For example, prongs 102, 104 can be configured to flex from and/or between a first position and/to a second position. Such "first position" can be a neutral and/or unstressed position and/or state of the prongs 102, 104. Such "first position" can be a position and/or state where the prongs 102, 104 and/or physiological sensor 100 is not secured to a nose 12, such as that shown in FIGS. 2A-2H. Such "second position" can be a stressed position and/or state of the prongs 102, 102 where the prongs 102, 104 and/or physiological sensor 100 are at least partially flexed, for example, inward (toward and/or in contact with one another) or outward from one another). For example, such second position can be a position or state when the physiological sensor 100 is secured to the user's nose 12, such as that shown in FIGS. 1A-1C, and in such position prongs 102, 104 may be at least partially flexed outward from one another. As discussed further below, physiological sensor 100 can include a biasing member, and such biasing member can bias the prong 102, 104 toward the above-described "first" position (for example, a neutral and/or unstressed position or state).

Figure 2A:
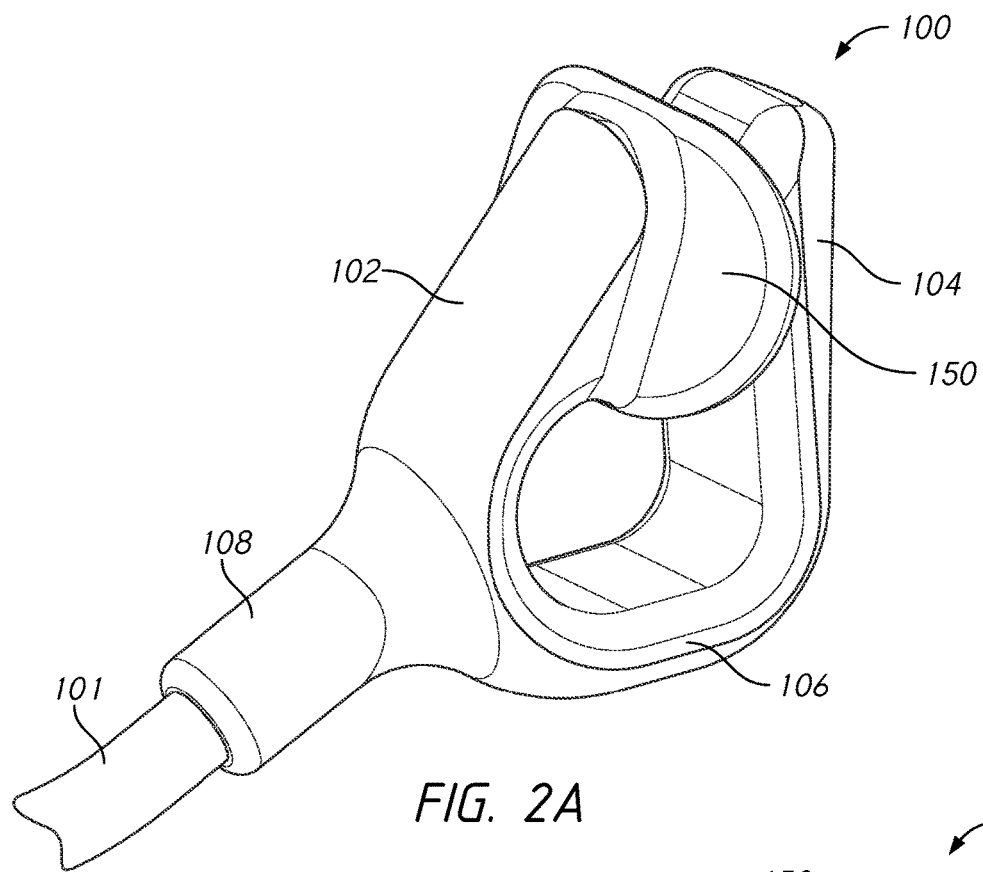
FIGS. 2A-2B illustrate perspective views of the physiological sensor of FIG. 1A in accordance with aspects of this disclosure.
Figure 2B:
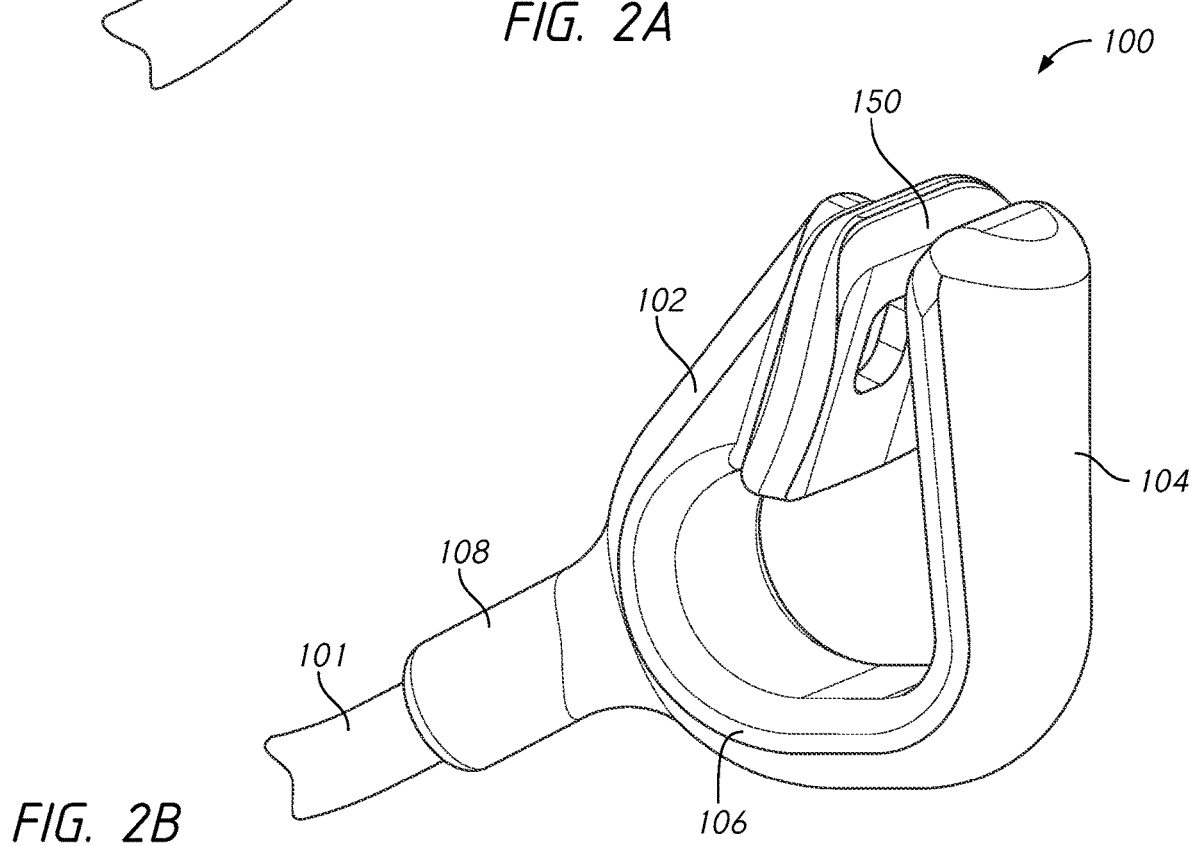
Figure 2C:
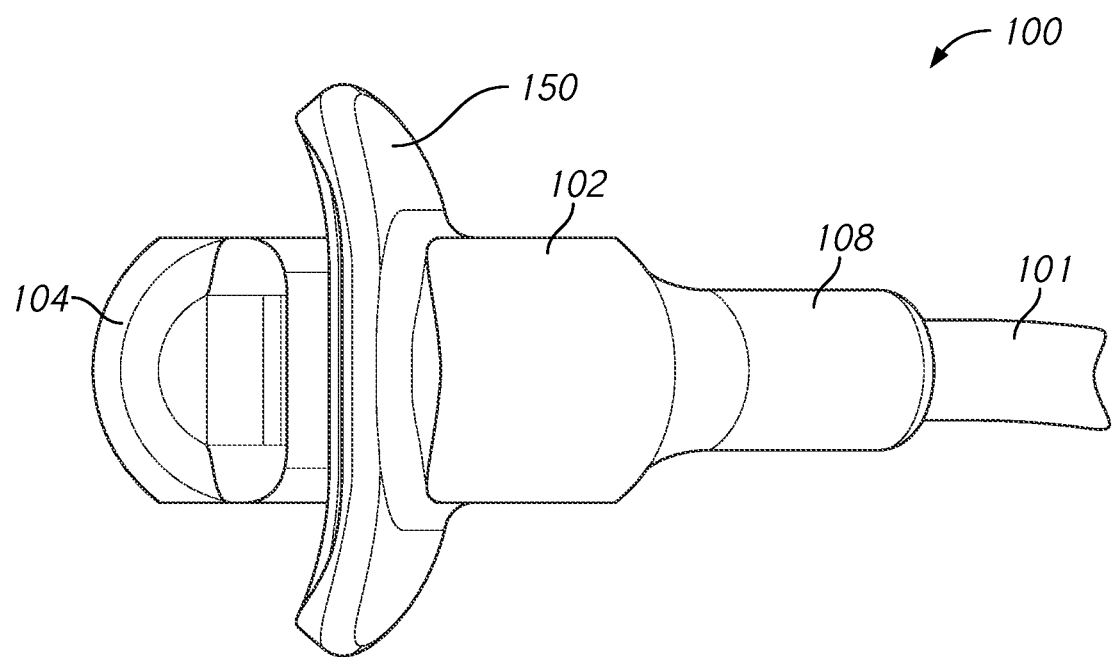
FIG. 2C illustrates a top view of the physiological sensor of FIG. 1A in accordance with aspects of this disclosure.
Figure 2D:
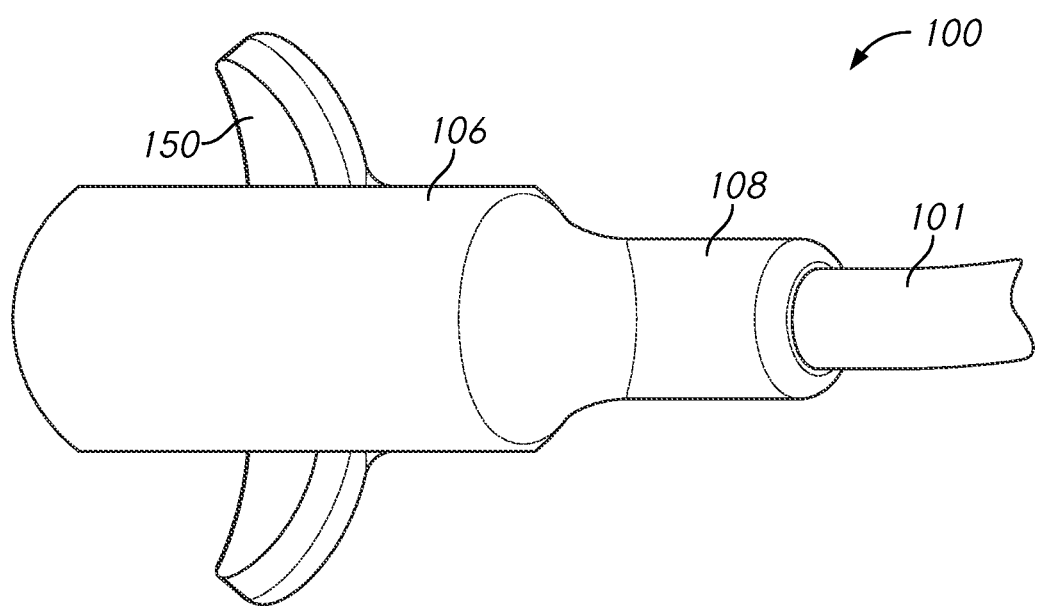
FIG. 2D illustrates a bottom view of the physiological sensor of FIG. 1A in accordance with aspects of this disclosure.
Figure 2E:
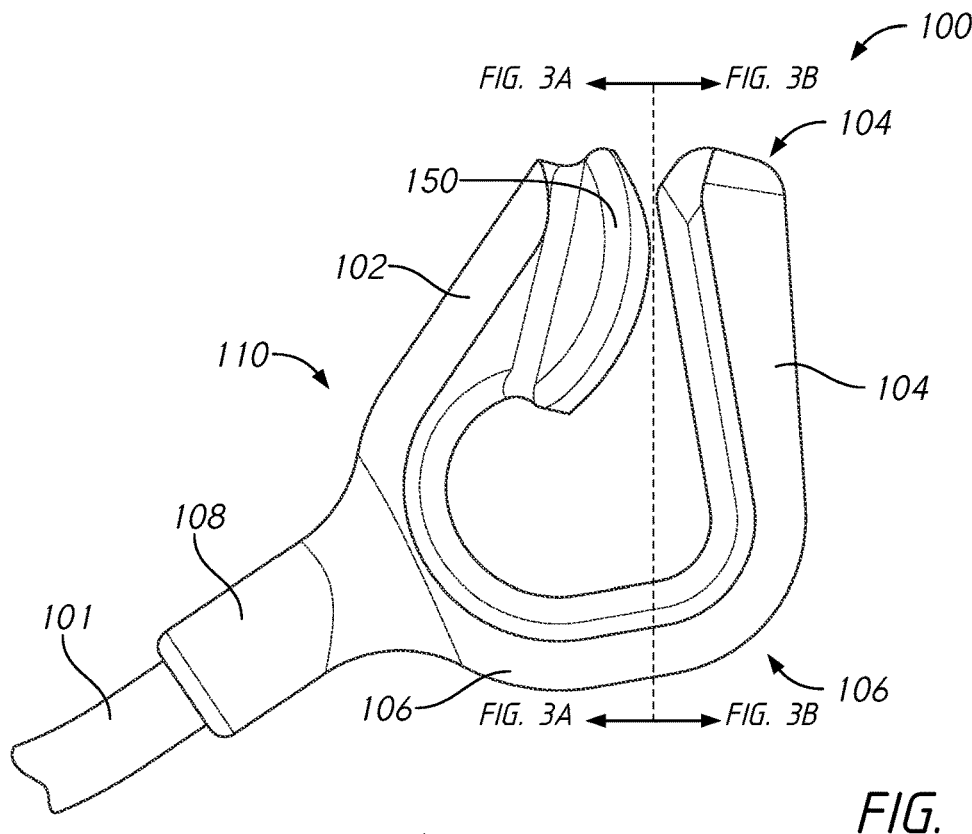
FIG. 2E illustrates a side view of the physiological sensor of FIG. 1A in accordance with aspects of this disclosure.
Figure 2F:
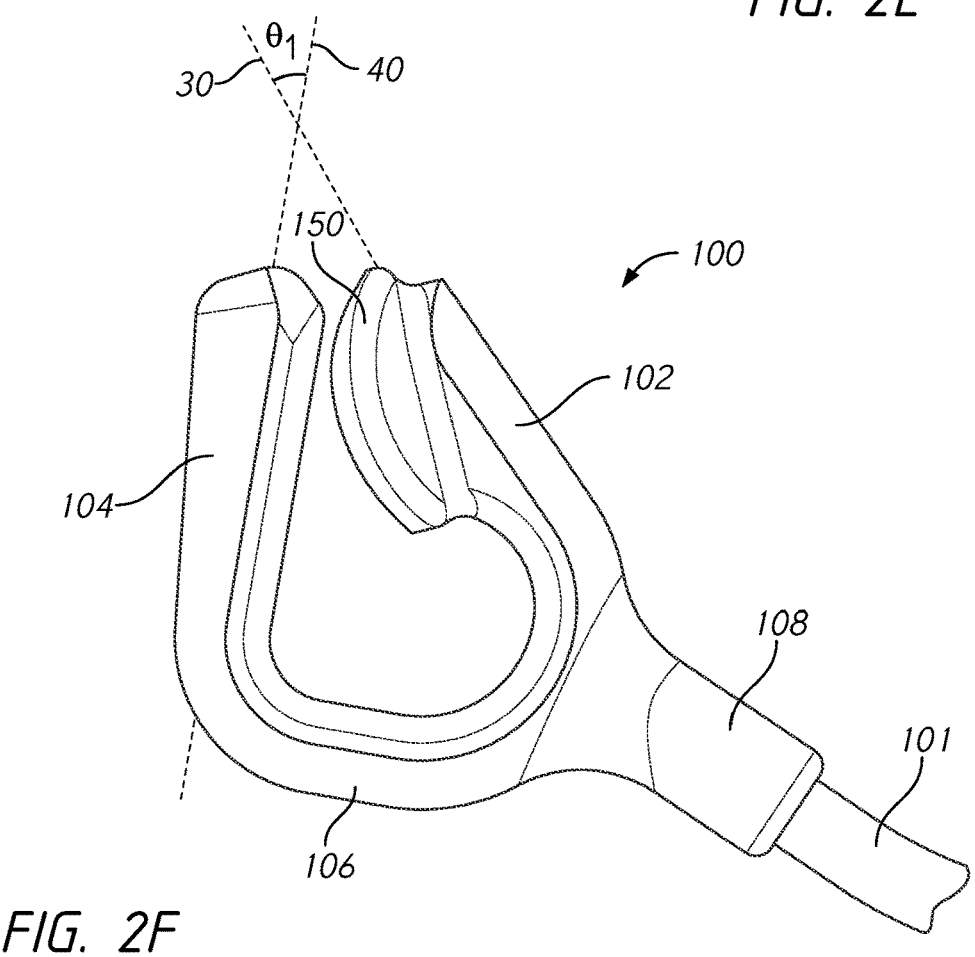
FIG. 2F illustrates another side view of the physiological sensor of FIG. 1A in accordance with aspects of this disclosure.
Figure 2G:
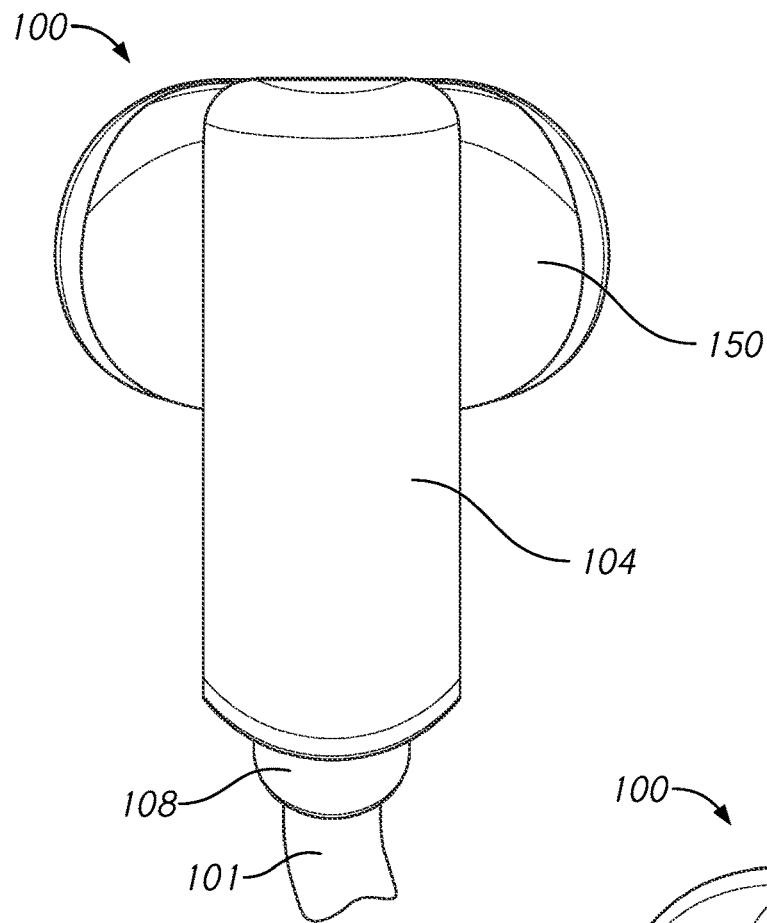
FIG. 2G illustrates a front view of the physiological sensor of FIG. 1A in accordance with aspects of this disclosure.
Figure 2H:
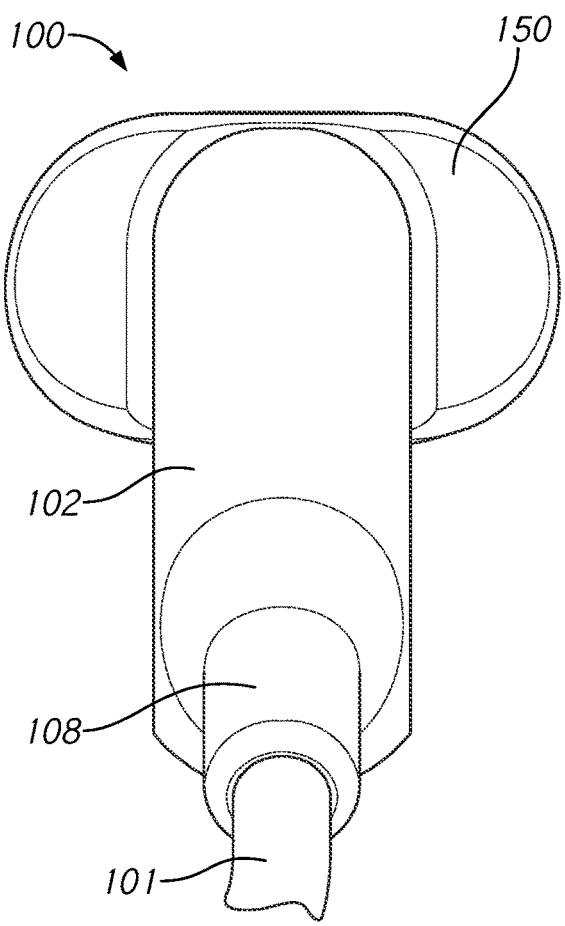
FIG. 2H illustrates a back view of the physiological sensor of FIG. 1A in accordance with aspects of this disclosure.

With continued reference to FIGS. 2E-2F, in some configurations physiological sensor 100 includes a coupling portion 106. Coupling portion 106 can connect prongs 102, 104 (for example, ends of prongs 102, 104) and/or can be positioned between prongs 102, 104 (for example, between ends of prongs 102, 104). As shown, coupling portion 106 can be curved. However, in alternative configurations, coupling portion 106 is not curved. For example, in some configurations, coupling portion 106 is comprised of one or more straight portions. In some alternative configurations, physiological sensor 100 does not include coupling portion 106.

Coupling portion 106 can be sized and/or shaped to conform to a size and/or shape of a rim or edge of a nostril. Coupling portion 106 can be configured to wrap around such rim or edge of nostril when physiological sensor 100 is secured to the user's nose 12 (see, for example, FIGS. 1C and 2E). In some configurations, coupling portion 106 is integral and/or contiguous with one or both of prongs 102, 104. For example, as discussed below, in some configurations, physiological sensor 100 includes a housing 110, and such housing 110 can at least partially define and/or form the coupling portion 106, prongs 102, 104, and/or winged portion 150 (discussed below). In some configurations, an entire portion of the physiological sensor 100 that contacts and/or is placed proximate or adjacent the user's nose 12 when in use is contiguous, which can greatly increase comfort to the user. In some configurations, entire exterior portions of the prong 102, prong 104, coupling portion 106, and/or winged portion 150 are defined by a single contiguous housing 110. As discussed further below, in some configurations, such housing 110 comprises a soft material (for example, a silicone material).

In some configurations, for example, where physiological sensor 100 includes and/or is coupled with cable 101, physiological sensor 100 includes a stem 108 (which may also be referred to herein as a "stem portion"). Stem 108 can be integral and/or contiguous with one or both of prongs 102, 104 and/or coupling portion 106. For example, as discussed below, in some configurations, physiological sensor 100 includes a housing 110, and such housing 110 can at least partially define and/or form the stem 108, coupling portion 106, prongs 102, 104, and/or winged portion 150. In some configurations, entire exterior portions of the stem 108, prong 102, prong 104, coupling portion 106, and/or winged portion 150, and are defined by a single contiguous housing 110. Stem 108 can be connected to and/or can extend outward from prong 102 and/or coupling portion 106 (for example, where physiological sensor 100 includes coupling portion 106). Stem 108 can extend outward from prong 102 and/or coupling portion 106 in a direction that is away from the nose 12 when physiological sensor 100 is secured to nose 12 during use (see FIGS. 1A-1C). Stem 108 can extend in a direction away from the prongs 102, 104 (for example, free ends of prongs 102, 104) and/or coupling portion 106. Stem 108 can be configured to receive cable 101. For example, stem 108 can include an opening sized and/or shaped to receive and/or secure cable 101.

In some configurations, prongs 102 and 104 are not parallel to one another. For example, in some configurations, prongs 102, 104 are not parallel to one another when the physiological sensor 100 is in one or both of the first and second positions discussed above. Prong 102 can extend, be positioned, and/or be oriented, at an angle with respect to prong 104, and vice versa. For example, with reference to FIG. 2F, an axis 30 extending through (for example, a center) of prong 102 and/or along a length of prong 102 (or a portion of a length of prong 102) can be oriented at an angle $\theta_1$ relative to an axis 40 extending through (for example, a center) of prong 104 and/or along a length of prong 104 (or a portion of a length of prong 104). Such angle $\theta_1$ can be between approximately 0° and approximately 90°, between approximately 10° and approximately 80°, between approximately 20° and approximately 70°, between approximately 30° and approximately 60°, between approximately 40° and approximately 50°, between approximately 20° and approximately 40°, between approximately 30° and approximately 50°, at least approximately 10°, at least approximately 20°, at least approximately 30°, at least approximately 40°, less than approximately 90°, less than approximately 80°, less than approximately 70°, less than approximately 60°, or less than approximately 50°, or any value or range between any of these values or ranges. In some configurations, angle $\theta_1$ is smaller when physiological sensor 100 is in a second position than when in a first position. As discussed above, such first position can be a neutral and/or unstressed position or state of the prongs 102, 104 and/or physiological sensor 100 and such second position can be a stressed position or state, such as where the prongs 102, 104 and/or physiological sensor 100 are at least partially flexed (for example, flexed outward from one another), for example, when secured to a portion of a user's nose.

Physiological sensor 100 can include one or more features and/or structural characteristics that are configured to conform to one or more portions of a user's nose in order to increase user comfort and provide a robust skin-sensor interface for improved accuracy of physiological parameter measurements. Such one or more features and/or structural characteristics can be configured to conform to, for example, outer portions and/or surfaces of a user's nose, such as on or near the ala, alar crease, or other region of the user's nose. For example, with reference to at least FIGS. 2A-2H, physiological sensor 100 can include a winged portion 150. Winged portion 150 can be coupled to a portion of prong 102, such as a free end of prong 102, or to another portion of prong 102. Winged portion 150 can be configured to contact tissue of the user (for example, tissue of the user's nose) when the physiological sensor 100 is in use. Winged portion 150 can be at least partially curved with respect to: prong 102; an axis extending through prong 102 or a portion of prong 102 (for example, axis 30) and/or extending along a length of prong 102; prong 104; an axis extending through prong 104 or a portion of prong 104 (for example, axis 40) and/or extending along a length of prong 104; and/or another axis. Winged portion 150 can be at least partially curved in another manner in some implementations. Such configuration can allow the physiological sensor 100 to comfortably contact a portion of the user's nose in a manner which provides a robust skin-sensor interface, which advantageously provides for more accurate measurement of physiological parameters via pulse oximetry components (for example, emitter(s) and detector(s)) which are discussed further elsewhere herein. Winged portion 150 can also advantageously provide more stability and securement of the physiological sensor 100 to the user's nose. For example, in some configurations, winged portion 150 can inhibit "rocking" and/or other rotational movement of the prong 102 and/or prong 104 with respect to the user's nose when physiological sensor 100 is secured thereto.

Winged portion 150 can include one or more portions extending outward from a portion of prong 102. For example, winged portion 150 can include one or more portions extending laterally from a portion of prong 102. With reference to FIG. 3A, winged portion 150 can include a first wing 150a and/or a second wing 150b. Winged portion 150 can include an intermediate portion 150c positioned between and/or connected to wings 150a, 150b. Wings 150a, 150b can extend outward from (for example, laterally from) intermediate portion 150c. For example, wings 150a, 150b can extend outward from intermediate portion 150c in a direction that is transverse (for example, perpendicular) to an axis 50 that extends through and/or along the intermediate portion 150c and/or a plane or surface defined by intermediate portion 150c. Axis 50 can extend along a height of the plane or surface defined by intermediate portion 150c. Wings 150a, 150b can extend in opposite directions from one another. In some implementations, wings 150a, 150b, and intermediate portion 150c are integrally formed.

As discussed above, winged portion 150 can be at least partially curved. With reference to at least FIGS. 2A-2H and 3A, wings 150a, 150b can curve around and/or with respect to intermediate portion 150c. For example, wings 150a, 150b can curve around and/or with respect to a plane or surface defined by intermediate portion 150c. As another example, wing 150a and/or 150b can curve around and/or with respect to axis 50 (discussed above) and/or an axis that is parallel to axis 50. Additionally or alternatively, wings 150a, 150b can curve at least partially toward prong 104 (see FIGS. 2C-2F). Wings 150a, 150b can be curved toward each other. In some configurations, winged portion 150 or portions thereof such as wing 150a, 150b, and/or intermediate portion 150c can have a concave shape, for example, with respect to prong 104 and/or axis 50 (see FIG. 2C). In some configurations, intermediate portion 150c is flat and/or straight. For example, in some configurations, a plane or surface defined by intermediate portion 150c can be planar (not curved). In some configurations, intermediate portion 150c is planar and one or both of wings 150a, 150b are curved. In some configurations, ends of wings 150a, 150b are rounded (see FIG. 3A). Such ends of wings 150a, 150b can represent opposite ends of the winged portion 150 and a width $w_1$ of winged portion 150 can extend between such ends.

Figure 3B:
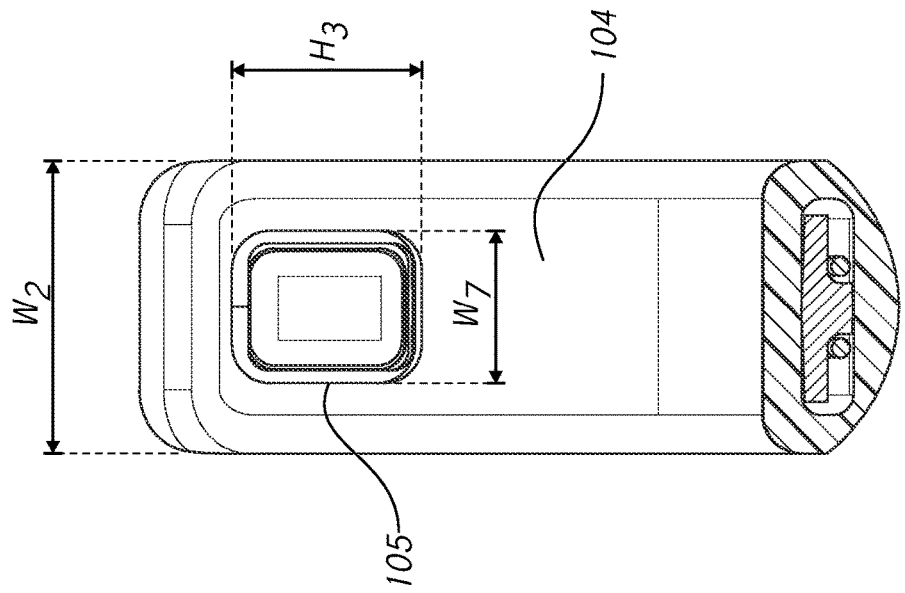
FIGS. 3A-3B illustrate cross-sections taken through a portion of the physiological sensor of FIG. 1A shown in FIG. 2E in accordance with aspects of this disclosure.
Figure 3A:
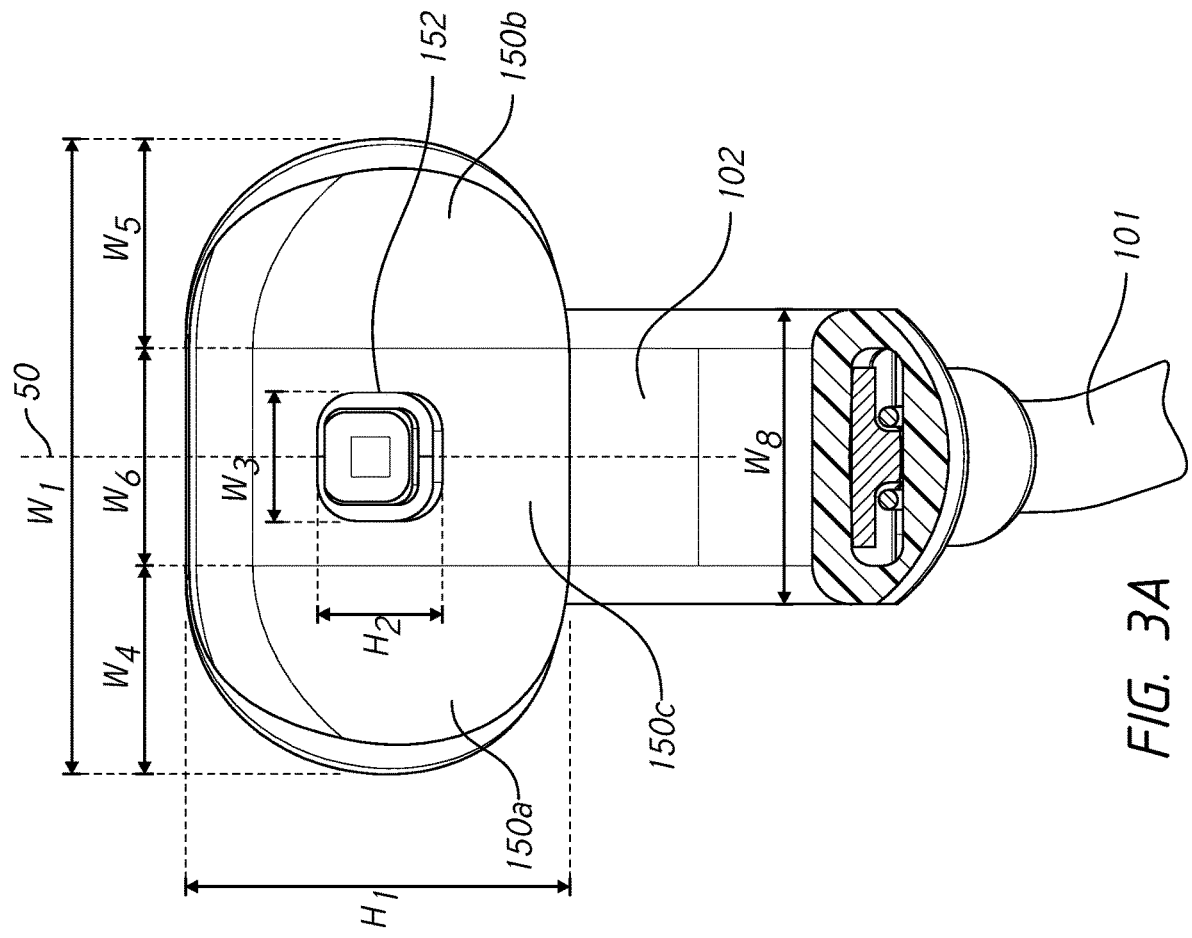

FIGS. 3A-3B illustrate cross-sections taken through physiological sensor 100 (see FIG. 2E) and show front views of the prongs 102, 104 respectively. As shown in FIGS. 3A-3B, the winged portion 150 can have a width $W_1$ and a height $H_1$, the prong 102 can have a width $W_8$, and the prong 104 can have a width $W_2$. In some configurations, width Wi is greater than one or both of width $W_2$ and width $W_8$. Width $W_2$ can be equal to, greater than, or smaller than width $W_8$. $W_1$ can be between approximately 0.1 inch and approximately 1 inch, for example, between approximately 0.2 inch and approximately 0.9 inch, between approximately 0.3 inch and approximately 0.8 inch, between approximately 0.4 inch and approximately 0.7 inch, or between approximately 0.5 inch and approximately 0.6 inch, or any value or range between any of these values or ranges, or any range bounded by any combination of these values. $W_2$ and/or $W_8$ can be between approximately 0.05 inch and approximately 0.5 inch, for example, between approximately 0.06 inch and approximately 0.4 inch, between approximately 0.07 inch and approximately 0.3 inch, between approximately 0.08 inch and approximately 0.2 inch, between approximately 0.1 inch and approximately 0.5 inch, or between approximately 0.1 inch and approximately 0.3 inch, or any value or range between any of these values or ranges, or any range bounded by any combination of these values.

A ratio between width Wi and width $W_8$ and/or a ratio between width $W_1$ and width $W_2$ can be between approximately 1 and approximately 5, between approximately 1.5 and approximately 4.5, between approximately 2 and approximately 4, between approximately 2.5 and approximately 3.5, between approximately 1 and approximately 3, between approximately 2 and approximately 2.5, at least approximately 1.5, at least approximately 2, at least approximately 2.5, or at least approximately 3, or any value or range between any of these values or ranges, or any range bounded by any combination of these values. Such configurations can advantageously allows the winged portion 150 to provide more stability and securement of the physiological sensor 100 to the user's nose 12.

With continued reference to FIG. 3A, wing 150a can have a width $W_4$, wing 150b can have a width $W_5$, and intermediate portion 150c can have a width $W_6$. In some configurations, width $W_6$ is greater than or equal to one or both of widths $W_4$, $W_5$. Alternatively, in some configurations, width $W_6$ is less than one or both of widths $W_4$, $W_5$. With reference to FIGS. 3A-3B, in some configurations, one or more of widths $W_4$, $W_5$, $W_6$ are equal to or less than width $W_2$ and/or width $W_8$. In some configurations, width $W_1$ is less than or equal to height $H_1$. In some configurations, width $W_1$ is greater than height $H_1$. A ratio between width $W_1$ and height $H_1$ can be between approximately 1 and approximately 5, between approximately 1.5 and approximately 4.5, between approximately 2 and approximately 4, between approximately 2.5 and approximately 3.5, between approximately 1 and approximately 3, between approximately 1 and approximately 2, between approximately 1.5 and approximately 2, between approximately 1.5 and approximately 2.5, at least approximately 1, at least approximately 1.5, at least approximately 2, at least approximately 2.5, or at least approximately 3, or any value or range between any of these values or ranges.

$W_4$, $W_5$, and/or $W_6$ can be between approximately 0.05 inch and approximately 0.5 inch, for example, between approximately 0.06 inch and approximately 0.4 inch, between approximately 0.07 inch and approximately 0.3 inch, between approximately 0.08 inch and approximately 0.2 inch, between approximately 0.1 inch and approximately 0.3 inch, or between approximately 0.1 inch and approximately 0.2 inch, or any value or range between any of these values or ranges.

$H_1$ can be between approximately 0.1 inch and approximately 1 inch, for example, between approximately 0.2 inch and approximately 0.9 inch, between approximately 0.3 inch and approximately 0.8 inch, between approximately 0.4 inch and approximately 0.7 inch, between approximately 0.5 inch and approximately 0.6 inch, between approximately 0.1 inch and approximately 0.4 inch, or between approximately 0.2 inch and approximately 0.4 inch, or any value or range between any of these values or ranges.

As discussed elsewhere herein, physiological sensor 100 can include a housing 110 (see FIGS. 4A-4B) that can at least partially define and/or form the coupling portion 106, prongs 102, 104, stem 108, and/or winged portion 150. With continued reference to FIGS. 3A-3B, physiological sensor 100 (for example, housing 110) can include an opening 152 which can be located in the winged portion 150. For example, as shown, opening 152 can be positioned on intermediate portion 150c. Opening 152 can be located (for example, centered) at a middle of height $H_1$ and/or at a middle of width $W_1$ of winged portion 150 or in another location. Opening 152 can extend through winged portion 150 (for example, intermediate portion 150c) and/or prong 102 into an interior 111 of the housing 110 (discussed further below). With reference to FIG. 3B, physiological sensor 100 (for example, housing 110) can include an opening 105 which can be located in prong 104. Opening 105 can extend into an interior 111 of a portion of housing 110 defined by the prong 104, for example. As discussed further below, opening 152 can allow light emitted from one or more emitters (for example, positioned within prong 102) to pass through housing 110 (for example, through prong 102) into tissue of the user and opening 105 can allow at least a portion of the emitted light pass into the housing 110 (for example, through prong 104) to one or more detectors positioned within prong 104 after the at least the portion of the emitted light passes through tissue.

As shown in FIGS. 3A-3B, opening 152 can have a width $W_3$ and a height $h_2$. As also shown, opening 105 can have a width $W_7$ and a height $H_3$. Width $W_3$ can be equal to, less than, or greater than height $H_2$. Width $W_7$ can be equal to, less than, or greater than height $H_3$. Width $W_3$ can be equal to, less than, or greater than width $W_7$. Height $H_2$ can be equal to, less than, or greater than height $H_3$. In some configurations, opening 152 has a square or rectangular shape. In some configurations, opening 152 has a rounded square or rounded rectangular shape. In some configurations, opening 105 has a square or rectangular shape. In some configurations, opening 105 has a rounded square or rounded rectangular shape. In some configurations, opening 152 is smaller than opening 105. In some configurations, opening 152 is greater than or equal to opening 105.

$W_3$, $H_2$, $H_3$, and/or $W_7$ can be between approximately 0.05 inch and approximately 0.5 inch, for example, between approximately 0.06 inch and approximately 0.4 inch, between approximately 0.07 inch and approximately 0.3 inch, between approximately 0.08 inch and approximately 0.2 inch, between approximately 0.08 inch and approximately 0.2 inch, or between approximately 0.9 inch and approximately 0.2 inch, or any value or range between any of these values or ranges, or any range bounded by any combination of these values.

A ratio between width $W_3$ and width $W_1$ can be between approximately 0.05 and approximately 0.5, between approximately 0.1 and approximately 0.4, or between approximately 0.2 and approximately 0.3, or any value or range between any of these values or ranges, or any range bounded by any combination of these values.

A ratio between height $H_2$ and height $H_1$ can be between approximately 0.1 and approximately 0.6, between approximately 0.2 and approximately 0.5, or between approximately 0.3 and approximately 0.4, or any value or range between any of these values or ranges, or any range bounded by any combination of these values.

A ratio between width $W_7$ and width $W_2$ can be between approximately 0.1 and approximately 1, between approximately 0.2 and approximately 0.9, between approximately 0.3 and approximately 0.8, between approximately 0.4 and approximately 0.7, or between approximately 0.5 and approximately 0.6, or any value or range between any of these values or ranges, or any range bounded by any combination of these values.

A ratio between height $H_3$ and height $H_2$ can be between approximately 1 and approximately 5, between approximately 1.5 and approximately 4.5, between approximately 2 and approximately 4, between approximately 2.5 and approximately 3.5, between approximately 1 and approximately 3, or between approximately 1 and approximately 2, or any value or range between any of these values or ranges, or any range bounded by any combination of these values.

A ratio between width $W_7$ and width $W_3$ can be between approximately 0.5 and approximately 5, between approximately 1 and approximately 4.5, between approximately 1.5 and approximately 4, between approximately 2 and approximately 3.5, between approximately 2.5 and approximately 3, or between approximately 1 and approximately 2, or any value or range between any of these values or ranges, or any range bounded by any combination of these values.

Figure 4A:
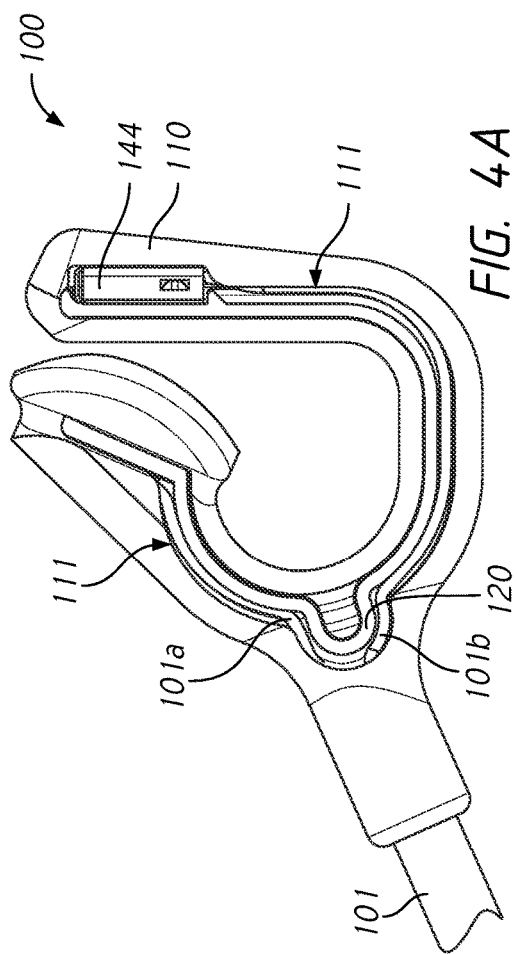
FIG. 4A illustrates a portion of the physiological sensor of FIG. 1A in accordance with aspects of this disclosure.

As mentioned previously and as shown in FIGS. 4A-4B, physiological sensor 100 can include a housing 110. FIG. 4A illustrates housing 110 with a portion cutaway/removed to illustrate an interior 111 of the housing 110. Such interior 111 can be configured to receive various mechanical and/or electrical components of physiological sensor 100. For example, such interior 111 can be sized and/or shaped to receive one or more wires of cable 101 (such as any or all of wires 101a, 101b, 101c, 101d discussed elsewhere herein), one or more emitters 130, one or more detectors 140, optical transmission material 132, optical transmission material 142, detector shield 144, and/or biasing member 120, each of which are discussed in more detail below. The interior 111 can extend throughout housing 110, for example, and can extend through all or a portion of prong 102, prong 104, coupling portion 106, winged portion 150, and/or stem 108, each of which can be formed and/or defined (at least partially) by housing 110 as discussed elsewhere herein. Openings 152 and/or 105 (discussed above) can lead into such interior 111.

Figure 4B:
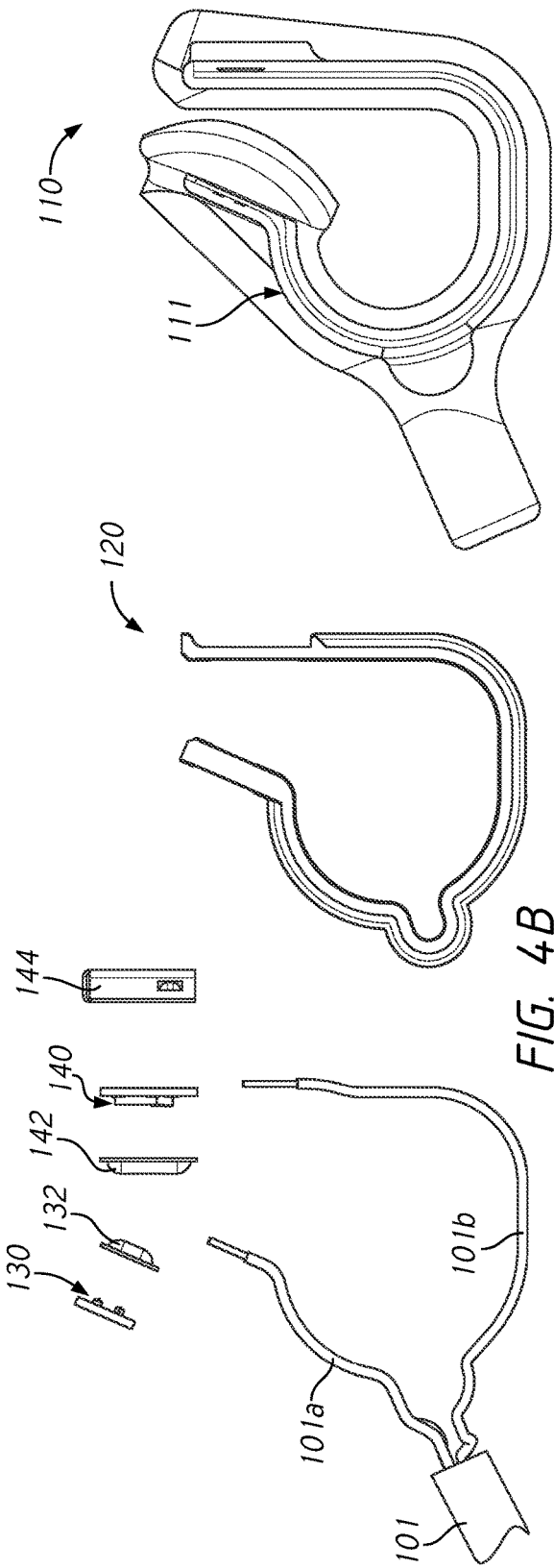
FIG. 4B illustrates an exploded view of the portion of the physiological sensor of FIG. 4A in accordance with aspects of this disclosure.

With reference to FIGS. 4A-4B, in some cases, physiological sensor 100 can be assembled by inserting the wires 101a, 101b, 101c, 101d, one or more emitters 130, one or more detectors 140, optical transmission material 132, optical transmission material 142, detector shield 144, and/or biasing member 120 into the interior 111 of housing 110 via an open portion such as that illustrated in FIGS. 4A-4B (which may also be referred to as an "cutaway portion", and subsequent to such placement, such interior 111 can be enclosed. For example, such open portion can be sealed or filled in with a material (such as silicone or another material that forms part of the housing 110). In some configurations, such open portion can be sealed (for example, during manufacturing of physiological sensor 100) with a sealant (such as a liquid sealant) which can cover the open portion which is illustrated in FIGS. 4A-4B (for example, such that the interior 111 is not visible via the side view of physiological sensor shown in FIG. 4A). In some configurations, such sealant is exposed and/or forms a portion of an exterior of the physiological sensor 100, for example, along with the housing 110. In such configurations, such sealant covering the open portion and the housing 110 can form the entire exterior of the physiological sensor 100 that is visible. In some configurations, such sealant comprises a similar material as the housing 110. In some configurations, the sealant covering the open portion and the housing 110 completely covers all or one or more of the emitter(s) 130, detector(s) 140, optical transmission material 132, optical transmission material 142, detector shield 144, and/or biasing member 120, and/or portions (for example, ends of) the wires 101a, 101b, 101c, 101d (for example, where the physiological sensor 100 includes cable 101 and wires 101a, 101b, 101c, 101d). As another example, in some configurations, the biasing member 120 is entirely covered by the housing 110 and/or a sealant covering a portion of the housing 110 which is cutaway (for manufacturing purposes as explained above). In some configurations, no portion of the biasing member 120 is exposed and/or no portion of the biasing member 120 is visible when the physiological sensor 100 is assembled.

Figure 6A:
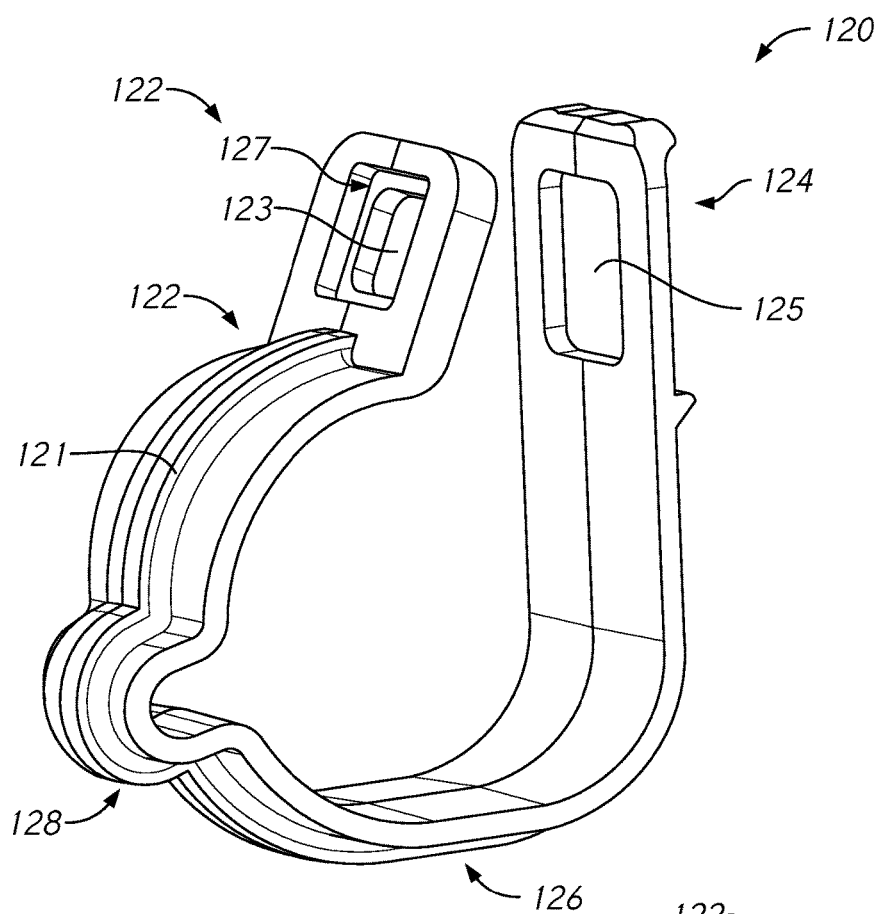
FIGS. 6A-6B illustrate a biasing member according to some implementations of the physiological sensor of FIG. 1A in accordance with aspects of this disclosure.
Figure 6B:
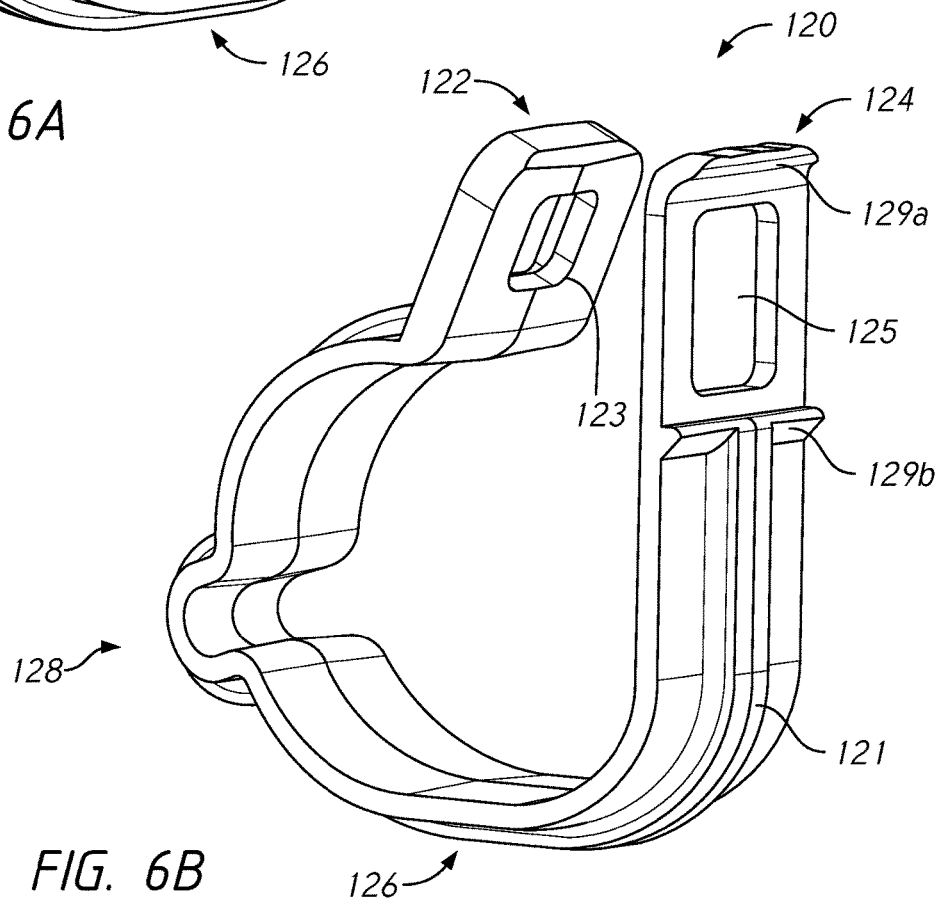

FIGS. 5A-5B illustrate perspective views of the physiological sensor 100 with the housing 110 removed. FIGS. 6A-6B illustrate the biasing member 120 shown in at least FIGS. 5A-5B, and FIGS. 7A-7B illustrate perspective views of portions of the physiological sensor 100 with both the housing 110 and the biasing member 120 removed.

As discussed elsewhere herein and as shown in FIGS. 5A-5B and 7A-7B, physiological sensor 100 can include a cable 101. In some configurations, cable 101 comprises one or more wires which are coupled to one or more emitters and one or more detectors of the physiological sensor 100. Such wires can couple, for example, to circuit boards which are coupled to (for example, which mount) the one or more emitters and one or more detectors. Such one or more wires can include one, two, three, four, five, six, seven, or eight or more wires. Such wires of the cable 101 can include no more than four wires in some configurations. The number of wires can correspond to a number of emitters and/or a number of detectors of the physiological sensor 100. As shown in FIGS. 5A-5B and 7A-7B, the one or more wires can include a first wire 101a, a second wire 101b, a third wire, 101c, and a fourth wire 101d. Wires 101a and 101c can be coupled to emitters 130, for example, via a circuit board 131 (see FIGS. 5B and 7A) and/or wires 101b, 101d can be coupled to detector(s) 140 via a circuit board 141 (see FIG. 7B). Wires 101a, 101c and wires 101b, 101d can be secured to circuit boards 131, 141 (respectively) by soldering, for example. Each of cable 101, and wires 101a, 101b, 101c, 101d are discussed further below.

In some configurations, circuit board 131 has a width and/or length that is less than or equal to approximately 0.20 inch, less than approximately 0.19 inch, less than or equal to approximately 0.18 inch, less than or equal to approximately 0.17 inch, less than or equal to approximately 0.16 inch, less than or equal to approximately 0.15 inch, less than or equal to approximately 0.14 inch, less than or equal to approximately 0.13 inch, less than or equal to approximately 0.12 inch, less than or equal to approximately 0.11 inch, or less than or equal to approximately 0.10 inch, or any value or range between any of these values or ranges, or any range bounded by any combination of these values or values within these ranges. In some configurations, the circuit board 131 has a width and length that are equal.

In some configurations, the circuit board 131 and optical transmission material 132 when coupled together have a combined height (in a direction orthogonal to the width and length of the circuit board 131) that is less than or equal to approximately 0.1 inch, less than approximately 0.09 inch, less than or equal to approximately 0.08 inch, less than or equal to approximately 0.07 inch, less than or equal to approximately 0.06 inch, less than or equal to approximately 0.05 inch, less than or equal to approximately 0.04 inch, less than or equal to approximately 0.03 inch, or less than or equal to approximately 0.02 inch, or any value or range between any of these values or ranges, or any range bounded by any combination of these values or values within these ranges. In some configurations, the circuit board 131 and optical transmission material 132 when coupled together have a combined height that is less than or equal to a width and/or a length of the circuit board 131.

In some configurations, circuit board 141 has a width and/or length that is less than or equal to approximately 0.20 inch, less than approximately 0.19 inch, less than or equal to approximately 0.18 inch, less than or equal to approximately 0.17 inch, less than or equal to approximately 0.16 inch, less than or equal to approximately 0.15 inch, less than or equal to approximately 0.14 inch, less than or equal to approximately 0.13 inch, less than or equal to approximately 0.12 inch, less than or equal to approximately 0.11 inch, or less than or equal to approximately 0.10 inch, or any value or range between any of these values or ranges, or any range bounded by any combination of these values or values within these ranges. In some configurations, the circuit board 141 has a width and length that not equal. For example, the circuit board 141 can have a width that is greater than a length of the circuit board 141 or vice versa. Alternatively, a width and length of circuit board 141 can be equal.

In some configurations, the circuit board 141 and optical transmission material 142 when coupled together have a combined height (in a direction orthogonal to the width and length of the circuit board 141) that is less than or equal to approximately 0.1 inch, less than approximately 0.09 inch, less than or equal to approximately 0.08 inch, less than or equal to approximately 0.07 inch, less than or equal to approximately 0.06 inch, less than or equal to approximately 0.05 inch, less than or equal to approximately 0.04 inch, less than or equal to approximately 0.03 inch, or less than or equal to approximately 0.02 inch, or any value or range between any of these values or ranges, or any range bounded by any combination of these values or values within these ranges. In some configurations, the circuit board 141 and optical transmission material 142 when coupled together have a combined height that is less than or equal to a width and/or a length of the circuit board 141.

As discussed above, physiological sensor 100 can include a biasing member 120. With reference to FIGS. 6A-6B, biasing member 120 can include a first arm 122 and a second arm 124. Biasing member 120 can be flexible and/or resilient. Biasing member 120 can comprise plastic, among other materials. Biasing member 120 can comprise a harder and/or more rigid material than housing 110. Biasing member 120 can be configured to have a greater stiffness than housing 110. Biasing member 120 can be configured to allow the physiological sensor 100 to move (for example, flex) between a variety of different positions, such as the first and second positions discussed above, to facilitate positioning and/or securement of the physiological sensor 100 to a portion of the user's body (for example, nose). Arms 122, 124 can be configured to flex and move away from and/or toward each other. Biasing member 120 can "bias" the physiological sensor 100 to the first position (for example, neutral and/or unstressed position as discussed above). FIGS. 6A-6B illustrate biasing member 120 in such first position.

As shown, arm 122 can have a curved portion and a straight portion. For example, arm 122 can have a curved portion connected to the coupling portion 126 (discussed below) and a straight portion positioned near an end (for example, a free end) of arm 122. Arm 124 can be straight and/or curved. For example, arm 124 can be entirely straight and coupled with coupling portion 126. Alternatively, arm 124 can comprise a straight portion and a curved portion, the curved portion being connected to the coupling portion 126. In such cases, the straight portion of the arm 124 can be longer than the curved portion of the arm 124.

With continued reference to FIGS. 6A-6B, biasing member 120 can include a coupling portion 126. Coupling portion 126 can connect arms 122, 124 (for example, ends of arms 122, 124) and/or can be positioned between arms 122, 124 (for example, between ends of arms 122, 124). Coupling portion 126 can be curved and/or straight. In some alternative configurations, biasing member 120 does not include coupling portion 126. Coupling portion 126 can be sized and/or shaped to conform to a size and/or shape of a rim or edge of a nostril. Coupling portion 126 can be configured to wrap around such rim or edge of nostril when physiological sensor 100 is secured to the user's nose 12.

In some configurations, biasing member 120 includes a protruding portion 128. As shown in FIGS. 6A-6B, protruding portion 128 can be positioned between and/or can connect the first arm 122 and the coupling portion 126. Protruding portion 128 can extend outward and/or away from the first arm 122 and the coupling portion 126, for example, in a direction away from the second arm 124. Protruding portion 128 can advantageously define a flex point or region of the biasing member 120. For example, biasing member 120 can be configured to flex about and/or with respect to the protruding portion 128. In some cases, such configuration can allow the first arm 122 to flex more easily, which can advantageously allow for better positioning and placement of the winged portion 150 of the physiological sensor 100 on an outer portion of the user's nose 12. In some cases, protruding portion 128 can provide mechanical support for the wires 101a, 101b, 101c, 101d, for example, portions of such wires 101a, 101b, 101c, 101d that are bent and/or otherwise oriented at an angle (for example, an approximately 90 degree angle). In some configurations, protruding portion 128 can advantageously add stiffness and/or rigidity to the biasing member 120.

As also shown in FIGS. 6A-6B, biasing member 120 can include a ridge or spine 121 extending along the first arm 122, protruding portion 128, coupling portion 126, and/or second arm 124 or portions thereof. Ridge 121 can extend transverse from (for example, perpendicular) to first arm 122, protruding portion 128, coupling portion 126, and/or second arm 124 or portions thereof (for example, surfaces thereof). Ridge 121 can provide stiffness for the biasing member 120, which can help the biasing member 120 be "biased" toward the first position as discussed above. Ridge 121 can be positioned and/or can extend along a center of the first arm 122, protruding portion 128, coupling portion 126, and/or second arm 124 or portions thereof as illustrated in FIGS. 6A-6B. However, ridge 121 can be positioned and/or can extend along a different portion other than a center of the first arm 122, protruding portion 128, coupling portion 126, and/or second arm 124 or portions thereof as illustrated in FIGS. 6A-6B. In some cases, ridge 121 can provide mechanical support for the wires 101a, 101b, 101c, 101d.

When physiological sensor 100 is assembled, biasing member 120 can be positioned proximate and/or can operably position the one or more emitters 130, one or more detectors 140, circuit board 131, circuit board 141, optical transmission material 132, and/or optical transmission material 142. Biasing member 120 can advantageously include one or more openings configured to allow light emitted from the one or more emitters 130 to pass therethrough and allow at least a portion of light attenuated through the user's tissue to pass to the detector(s) 140. For example, as shown in FIGS. 5A-6B, biasing member 120 can include an opening 123 extending through a portion of arm 122 and an opening 125 extending through a portion of arm 124. Opening 123 can be positioned at or near an end of arm 122 (for example, a free end of arm 122) and opening 125 can be positioned at or near an end of arm 124 (for example, a free end of arm 124). Openings 123, 125 can be at least partially aligned with one another and/or can at least partially face one another. When the biasing member 120 and/or physiological sensor 100 is in a first position where the biasing member 120 (and physiological sensor 100) is in a neutral state, openings 123, 125 can be at least partially aligned with one another and/or can at least partially face one another. Additionally or alternatively, when the biasing member 120 and/or physiological sensor 100 is in a second position, for example, where the biasing member 120 (and physiological sensor 100) is flexed outward (such that arms 122 and 124 are flexed outward), openings 123, 125 can be at least partially aligned with one another and/or can at least partially face one another. In some configurations, an axis extending through a center of opening 123 at least partially extends through opening 125 and/or an axis extending through a center of opening 125 at least partially extends through opening 123. In some configurations, when the biasing member 120 and/or physiological sensor 100 is in the first position discussed above, an axis extending through a center of opening 123 at least partially extends through opening 125 and/or an axis extending through a center of opening 125 at least partially extends through opening 123. Additionally or alternatively, in some configurations, when the biasing member 120 and/or physiological sensor 100 is in the second position discussed above, an axis extending through a center of opening 123 at least partially extends through opening 125 and/or an axis extending through a center of opening 125 at least partially extends through opening 123. Either or both of openings 123, 125 can comprises a square or rectangular shape. For example, either or both of openings 123, 125 can comprise a rounded square or rounded rectangular shape. In some configurations, opening 123 is smaller than opening 125. Alternatively, in some configurations, opening 123 is equal to or greater than opening 125. With reference to FIGS. 3A-3B and 6A-6B, in some configurations, opening 123 of biasing member 120 is smaller than opening 152 of winged portion 150. In some configurations, opening 125 of biasing member 120 is smaller than opening 105 of prong 104. Alternatively, in some configurations, opening 123 is equal to or greater than opening 152 and/or opening 125 is equal to or greater than opening 105.

Biasing member 120 can advantageously be configured to retain and/or secure the one or more emitters 130, one or more detectors 140, and/or circuit boards 131, 141 coupled to emitters 130 and detectors 140. For example, with reference to FIGS. 5A-7B, biasing member 120 can include a recessed portion 127 sized and/or shaped to receive and/or secure circuit board 131 and/or emitters 130 coupled thereto. Recessed portion 127 can be recessed from a surface of arm 122 a given depth that corresponds to a thickness of circuit board 131. As shown, recessed portion 127 can surround opening 123. In some configurations where physiological sensor 100 includes optical transmission material 132 (discussed further below), recessed portion 127 can be sized and/or shaped to receive and/or such optical transmission material 132 along with circuit board 131 and/or emitters 130. Recessed portion 127 can comprise a square or rectangular shape, among others. Recessed portion 127 can comprises a rounded square or rounded rectangular shape, for example. As shown, recessed portion 127 (and/or opening 123) can be positioned on a straight portion of arm 122.

Arm 124 of biasing member 120 can include features to retain and/or secure detector 140, circuit board 141, optical transmission material 142, and/or detector shield 144, each of which are discussed in more detail below. For example, with reference to FIGS. 5A-6B, biasing member 120 can include lips 129a, 129b that extend outward from portions of arm 124 at and/or around opening 125. For example, lips 129a, 129b can extend transverse to (for example, perpendicular) to a surface of arm 124 a distance. Lips 129a, 129b can be spaced from one another a given distance sized to match a dimension (for example, height) of the detector shield 144 to allow the detector shield 144 to be positioned and/or at least partially secured therebetween. As shown, ridge 121 can extend along a portion of the arm 124 and terminate at lip 129b.

Biasing member 120 can help guide and position the wires 101a, 101b, 101c, 101d. For example, with reference to FIGS. 5A-5B, wires 101a, 101c can be positioned along surfaces of the protruding portion 128 and arm 122, for example, on opposite sides of ridge 121. Similarly, wires 101b, 101d can be positioned along surfaces of protruding portion 128, coupling portion 126, and arm 124, for example, on opposite sides of ridge 121. Ridge 121 thus can advantageously help prevent movement, tangling, and/or interference between wires 101a, 101b, 101c, 101d.

In some configurations, biasing member 120 is configured to inhibit or prevent ambient light from reaching the one or more detectors 140 and/or is configured to reduce an amount of ambient light that reaches the one or more detectors 140. Additionally or alternatively, biasing member 120 can be configured to inhibit, prevent, or reduce an amount of light piping that may occur if light emitted from the one or more emitters 130 is guided (for example, "piped") by and/or through portions of the physiological sensor 100 and reaches the one or more detectors 140 without passing through (for example, being attenuated and/or reflected by) tissue of a subject. In some configurations, the biasing member 120 comprises a dark color, such as black, that inhibits, prevents, and/or reduces an amount of ambient light that reaches the one or more detectors 140 and/or which inhibit, prevent, or reduce an amount of light piping. In some configurations, the biasing member 120 is opaque.

As discussed above, physiological sensor 100 can include one or more emitters 130 and one or more detectors 140. For example, physiological sensor 100 can include one, two, three, four, five, six, seven, or eight or more emitters 130 and/or one, two, three, four, five, six, seven, or eight or more detectors 140. Emitter(s) 130 can serve as a source of optical radiation that can be directed towards tissue of the user when the physiological sensor 100 is in use. Emitter(s) 130 can be light-emitting diodes (LEDs), laser diodes, incandescent bulbs with appropriate frequency-selective filters, combinations of the same, or the like. Emitter(s) 130 can emit light of one or more wavelengths and can emit visible and near-infrared optical radiation. Emitter(s) 130 can be similar or identical to any of the emitters discussed in U.S. Pat. No. 9,277,880, which is incorporated by reference herein in its entirety.

Detector(s) 140 can detect light that attenuates through and/or is reflected by tissue of the user, for example, tissue of the user's nose 12. Detector(s) 140 can output one or more signals responsive to the detected light. Detector(s) 140 can be photodiodes, phototransistors, or the like. Detector(s) 140 can be similar or identical to any of the emitters discussed in U.S. Pat. No. 9,277,880, which is incorporated by reference herein in its entirety.

In some configurations, physiological sensor can include an optical transmission material 132 and/or optical transmission material 142 positioned adjacent to the one or more emitters 130 and one or more detectors 140 (respectively) (see FIGS. 5A-5B and 7A-7B). Optical transmission material 132 can be positioned between the emitter(s) 130 and the tissue when the physiological sensor 100 is in use and optical transmission material 142 can be positioned between the detector(s) 140 and the tissue when the physiological sensor 100 is in use. Optical transmission material 132 can comprise a lens configured to focus light emitted from the one or more emitters 130 into tissue of the user. Alternatively, optical transmission material 132 can comprise a diffuser configured to spread out, disseminate, and/or scatter light exiting from the emitter(s) 130 prior to such light entering the user's tissue. This can permit light originating from the emitter(s) 130 to pass through a greater amount of tissue and can facilitate more accurate determination of physiological parameters (such as any of those discussed herein). Optical transmission material 142 can comprise a lens configured to focus light (or at least a portion of light) attenuated by and/or reflected from tissue into and/or towards the detector(s) 140.

With continued reference to FIGS. 5A-5B and 7A-7B, physiological sensor 100 can include a detector shield 144 configured to enclose and/or surround at least a portion of detector(s) 140 and/or circuit board 141 that can be coupled to detector(s) 140. Detector shield 144 can advantageously inhibit or prevent ambient light and/or light emitted from the emitter(s) 130 that does not pass through tissue to arrive at the detector(s) 140, which can advantageously improve the integrity of the physiological parameter determination. Additionally or alternatively, detector shield 144 can shield the one or more detectors 140 against and/or with respect to electromagnetic noise. For example, in some configurations, the detector shield 144 can act as a Faraday cage or shield to block electromagnetic fields. As shown, detector shield 144 can include an opening 144a at least partially aligned with opening 125 of biasing member 120 that can be sized and/or shaped to allow at least a portion of the emitted light arrive at the detector(s) 140 after passing through tissue.

As discussed elsewhere herein, in some configurations, physiological sensor 100 includes a cable 101 that can allow connecting to a separate monitoring device. FIGS. 8A-8B illustrate optional features and/or components that can be included into and/or can form part of cable 101. FIGS. 8A-8B illustrate wires 101a, 101b, 101c, and 101d discussed previously, as well as an outer jacket 101e, an outer shield 101f positioned within the outer jacket 101e, and a structural member 101g. Structural member 101g can be a wire, such as a non-conductive wire, or other member that provides support and/or facilitates positioning of wires 101a, 101b, 101c, 101d, for example, within an interior of outer jacket 101e and/or outer shield 101f. Structural member 101g can be positioned and/or aligned along a center of a cross-section of the outer jacket 101e. Structural member 101g can extend along a length of the outer jacket 101e (or a portion thereof) and/or can extend along a length of the outer shield 101f (or a portion thereof). Structural member 101g can be positioned in between the wires 101a, 101b, 101c, 101d as shown. Structural member 101g can advantageously act as a filler and can allow the wires 101a, 101b, 101c, 101d to be positioned and/or spaced around an interior of the outer shield 101f and/or outer jacket 101e in the configuration illustrated. However, in some configurations, the cable 101 does not include the structural member 101g and/or does not include the outer shield 101f. Structural member 101g can be and/or comprise a Kevlar fiber and/or material, among others. For example, structural member 101g can be a Kevlar fiber having a minimum pull strength of 5 Kg, 6 Kg, 7 Kg, 8 Kg, 9 Kg, 10 Kg, 11 Kg, 12 Kg, 13 Kg, 14 Kg, or 15 Kg or more. In some configurations, wires 101a, 101b, 101c, 101d can be twisted about and/or around the structural member 101g.

Outer jacket 101e can comprise an exterior of the cable 101. Outer jacket 101e can comprise one or more or a variety of materials. For example, outer jacket 101e can comprise Lee Hung Uroprene E198G60-82A-1 TPE Semi-Pressure material. In some configurations, outer jacket 101e has an inner diameter of approximately 0.016" and an outer diameter of approximately 0.087". In some configurations, outer jacket 101e has a hardness of 82 Shore A. Outer shield 101f can be positioned in between outer jacket 101e and the wires 101a, 101b, 101c, 101d, structural member 101g. Outer shield 101f can comprise one or more or a variety of materials. For example, outer shield 101f can comprise copper. As another example, outer shield 101f can comprise 44 AWG tinned copper. Outer shield 101f can comprise ETP, UNS C11040 electrolytic tough-pitch copper per ASTM-B 49-98 in some configurations.

Advantageously, each of the wires 101a, 101b, 101c, 101d can be individually shielded with a conductive material. For example, each wire 101a, 101b, 101c, 101d can be individually shielded with a 32 gauge conductor comprising a conductive material. Such conductive material can comprise copper (for example, ETP, UNS C11040 electrolytic tough-pitch copper per ASTM-B 49-98). As another example, each wire 101a, 101b, 101c, 101d can be individually shielded with a 32 gauge conductor comprising tinned copper, jacketed by a wall of polypropylene and coextruded by a wall of semi-conductive PVC (for example, HiTek VC-1 PVC). In some configurations, wires 101a, 101b, 101c, 101d can be constructed in accordance with concentric stranded construction, for example, according to ASTM B8-11.

Sensor System

This disclosure describes embodiments of physiological sensors that can be utilized to determine one or more physiological parameters of a subject. Various embodiments of the physiological sensors discussed herein can be configured to interact and/or communicate with separate computing devices via wired and/or wireless methods. For example, some embodiments of physiological sensors discussed herein can be configured to connect with a separate computing devices (for example, physiological monitoring devices) and/or transmit determined one or more physiological parameters and/or one or more signals generated associated with and/or indicative of such physiological parameters. Various embodiments of physiological sensors discussed herein and/or computing devices configured to interact with (for example, connect to) such physiological sensors can include hardware and/or software capable for determining and/or monitoring one or more physiological parameters of a subject, including, but not limited to, temperature, blood pressure, heart rate, respiratory rate (RRa), total hemoglobin (SpHb®), carboxyhemoglobin (SpCO®), methemoglobin (SpMet®), oxygen content (SpOC™), oxygen saturation (SpO2), pulse rate (PR), perfusion index (Pi), blood pressure, pleth variability index (PVi®), electroencephalogram (EEG) data, trending values of the same or combinations of the same, wellness indexes, or the like.

Although various embodiments of the physiological sensors discussed herein include pulse oximetry components (for example, one or more emitters and one or more detectors), the physiological sensors can include one or more additional or alternative components that can enable measurement of any of a variety of physiological parameters, including but not limited to those discussed herein. For example, some embodiments of the physiological sensors discussed herein can include, in addition or as an alternative to pulse oximetry components, acoustic piezoelectric devices, electrical ECG leads, among others. Any or all of the physiological sensors discussed herein can generate one or more signals based on physiological data and/or characteristics of a subject. By way of non-limiting example, any of the physiological sensors discussed herein which include emitter(s) and detector(s) can generate one or more signals responsive to light detected by the detector(s) that is attenuated and/or reflected by tissue of the subject. Such generated signal(s) can be transmitted by the physiological sensor to a separate monitoring device via a cable (for example, cable 101) and/or wirelessly. Such signal(s) can be received and/or processed by such monitoring device (for example, by one or more processors of the monitoring device) and one or more physiological parameters can be determined based on such signal(s), for example, continuously and/or periodically. In some configurations, such monitoring device can be configured to display the determined physiological parameters and/or information indicative of and/or related to such determined parameters.

Figure 9:
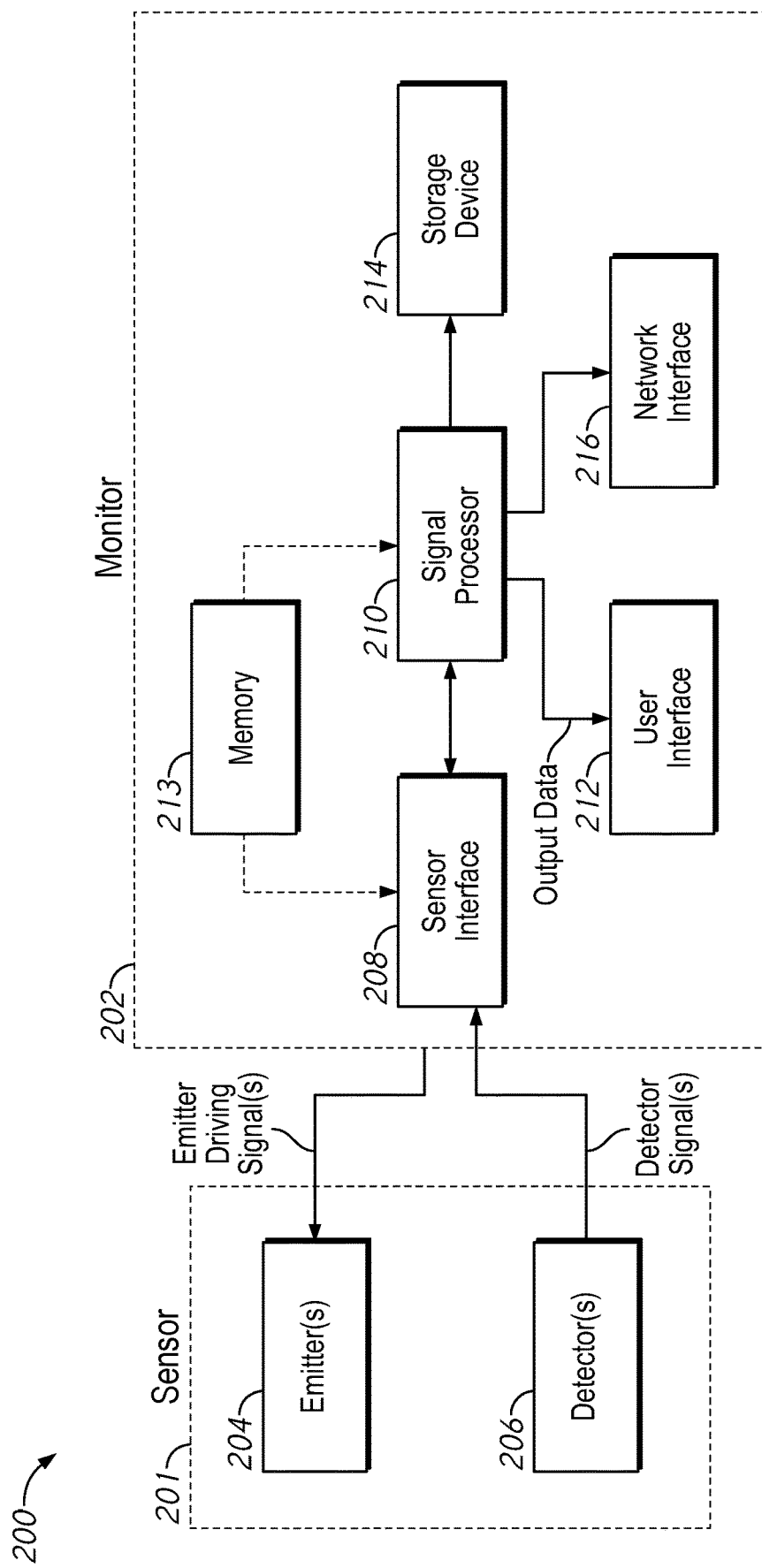
FIG. 9 illustrates a schematic diagram illustrating aspects of an example system that can include the physiological sensor and a monitor in accordance with aspects of this disclosure.

FIG. 9 illustrates a block diagram of an example embodiment of a monitoring system 200. As shown, the system 200 can include a physiological sensor 201 and a monitor 202 (which can also be referred to as a "monitoring device" or a "physiological monitoring device"). Physiological sensor 206 can be any of the physiological sensors discussed herein (for example, physiological sensor 100). Monitor 202 can be any of a variety of computing devices that can be configured to connect to (for example, wirelessly or via wired means) and receive and/or process data from physiological sensor 201. Any or all of the features discussed with respect to FIG. 9 can be incorporated into and/or included in any of the physiological sensors discussed herein (for example, physiological sensor 100). For example, in some implementations, physiological sensor 100, 200 can include a memory, signal processor, storage device, and/or network interface that can be similar or identical to memory 213, signal processor 210, storage device 214, and/or network interface 216 (respectively). System 200 can be utilized to determine and/or monitor one or more physiological parameters of a user, such as any of the physiological parameters discussed herein. For example, system 200 can be utilized to determine and/or monitor one or more physiological parameters based on one or more signals received from and generated by the physiological sensor 201 based on detected light attenuating through tissue of the user (for example, tissue of the user's nose). In some configurations, physiological sensor 201 is separate from monitor 202 and is configured to removably connect to monitor 202. Alternatively, in some configurations, physiological sensor 201 and monitor 202 are integrated together into a single unit. In some configurations, physiological sensor 201 is configured to receive power from the monitor 202. In some configurations, physiological sensor 201 does not include a power source.

As shown, physiological sensor 201 can include one or more emitters 204 and one or more detectors 206. The one or more emitters 204 can serve as the source of optical radiation transmitted towards a tissue measurement site of the user. The one or more emitters 204 can include one or more sources of optical radiation, such as LEDs, laser diodes, incandescent bulbs with appropriate frequency-selective filters, combinations of the same, or the like. In some configurations, the one or more emitters 204 includes sets of optical sources that are capable of emitting visible and near-infrared optical radiation.

As shown, the monitor 202 can include a sensor interface 208. Sensor interface 208 (which can also be referred to herein as a "front end interface") can facilitate communication between the physiological sensor 201 and the monitor 202 (for example, components of monitor 202). Sensor interface 208 can provide an interface that adapts the output of the one or more detectors 206 (for example, one or more signals generated by the one or more detectors 206), which is responsive to, associated with, and/or indicative of desired physiological parameters. For example, the sensor interface 208 can adapt one or more signals received from one or more of the one or more detectors 206 into a form that can be processed by the monitor 202, for example, by a signal processor 210 of the monitor 202. The sensor interface 208 can have its components assembled in the monitor 202 as shown. Alternatively, in some configurations, the sensor interface 208 can have its components assembled in the physiological sensor 201 and/or in connecting cabling (if used), combinations of the same, or the like. The location of the sensor interface 208 can be chosen based on various factors including space desired for components, desired noise reductions or limits, desired heat reductions or limits, and the like.

The sensor interface 208 can be coupled to the one or more detectors 206 and to the signal processor 210 using a bus, wire, electrical or optical cable, flex circuit, or some other form of signal connection. The sensor interface 208 can also be at least partially integrated with various components, such as the detectors 206. For example, the sensor interface 208 can include one or more integrated circuits that are on the same circuit board as the detectors 206 or the signal processor 210. Other configurations can also be used.

The sensor interface 208 can be implemented using one or more amplifiers, such as transimpedance amplifiers, that are coupled to one or more analog to digital converters (ADCs) (which can be in the monitor 202), such as a sigma-delta ADC. A transimpedance-based sensor interface 208 can employ single-ended circuitry, differential circuitry, and/or a hybrid configuration. A transimpedance-based sensor interface 208 can be useful for its sampling rate capability and freedom in modulation/demodulation algorithms. For example, this type of sensor interface 208 can advantageously facilitate the sampling of the ADCs being synchronized with the pulses emitted from the emitter 204. The ADC or ADCs can provide one or more outputs into multiple channels of digital information for processing by the signal processor 210 of the monitor 202. Each channel can correspond to a signal output from a respective one of the one or more detectors 206, for example.

In some configurations, a programmable gain amplifier (PGA) can be used in combination with a transimpedance-based sensor interface 208. For example, the output of a transimpedance-based sensor interface 208 can be output to a PGA that is coupled with an ADC in the monitor 202. A PGA can be useful in order to provide another level of amplification and control of the stream of signals from the detectors 206. Alternatively, the PGA and ADC components can be integrated with the transimpedance-based sensor interface 208 in the sensor 201. In some configurations, the sensor interface 208 can be implemented using switched-capacitor circuits. A switched-capacitor-based sensor interface 208 can be useful for, in certain embodiments, its resistor-free design and analog averaging properties. In addition, a switched-capacitor-based sensor interface 208 can be useful because it can provide a digital signal to the signal processor 210 in the monitor 202.

The monitor 202 can be configured to drive the one or more emitters 204 of the physiological sensor 201 via a driver. Such driver can be a circuit or the like that is controlled by the monitor 202. For example, the driver can provide pulses of current to the one or more emitters 204. In some configurations, the driver drives the one or more emitters 204 in a progressive fashion, such as in an alternating manner. The driver can drive the one or more emitters 204 with a series of pulses of about 1 milliwatt (mW) for some wavelengths that can penetrate tissue relatively well and from about 40 mW to about 200 mW for other wavelengths that tend to be significantly absorbed in tissue. A wide variety of other driving powers and driving methodologies can be used in various embodiments. The driver can be synchronized with other parts of the physiological sensor 201 and can minimize or reduce jitter in the timing of pulses of optical radiation emitted from the one or more emitters 204. In some configurations, the driver is capable of driving the one or more emitters 204 to emit optical radiation in a pattern that varies by less than about 10 parts-per-million.

The one or more detectors 206 can detect light that is attenuated by and/or reflected from the measurement site. The one or more detectors 206 can output one or more detector signals responsive to the detected light. The one or more detectors 206 can be implemented using one or more photodiodes, phototransistors, or the like.

As shown in FIG. 9, the monitor 202 can include the signal processor 210 and a user interface 212, such as a display. The monitor 202 can also include optional outputs alone or in combination with the display, such as a storage device 214 and a network interface 216. The signal processor 210 can include processing logic that determines measurements for desired physiological parameters, based on the signals received from the one or more detectors 206. The signal processor 210 can be implemented using one or more microprocessors or subprocessors (for example, cores), digital signal processors, application specific integrated circuits (ASICs), field programmable gate arrays (FPGAs), combinations of the same, and the like. The signal processor 210 can provide various signals that control the operation of the physiological sensor 201. For example, the signal processor 210 can provide an emitter control signal to a driver of the monitor 202 which drives the one or more emitters 204. This control signal can be useful in order to synchronize, minimize, or reduce jitter in the timing of pulses emitted from the one or more emitters 204. Accordingly, this control signal can be useful in order to cause optical radiation pulses emitted from the emitter(s) 204 to follow a precise timing and consistent pattern. For example, when a transimpedance-based sensor interface 208 is used, the control signal from the signal processor 210 can provide synchronization with the ADC in order to avoid aliasing, cross-talk, and the like. As also shown, an optional memory 213 can be included in the sensor interface 208 and/or in the signal processor 210 or elsewhere as part of monitor 202. This memory 213 can serve as a buffer or storage location for the sensor interface 208 and/or the signal processor 210, among other uses.

The user interface 212 can provide an output, for example, on a display, for presentation to a user of the data collection system 200. The user interface 212 can be implemented as a touch-screen display, an LCD display, an organic LED display, or the like. In addition, the user interface 212 can be manipulated to allow for measurement on the non-dominant side of patient. For example, the user interface 212 can include a flip screen, a screen that can be moved from one side to another on the monitor 202, or can include an ability to reorient its display indicia responsive to user input or device orientation. In some configurations, the system 200 can be provided without a user interface 212 and can simply provide an output signal to a separate display or system.

Storage device 214 and network interface 216 represent other optional output connections that can be included in the monitor 202. The storage device 214 can include any computer-readable medium, such as a memory device, hard disk storage, EEPROM, flash drive, or the like. The various software and/or firmware applications can be stored in the storage device 214, which can be executed by the signal processor 210 or another processor of the monitor 202. The network interface 216 can be a serial bus port (RS-232/RS-485), a Universal Serial Bus (USB) port, an Ethernet port, a wireless interface (for example, WiFi such as any 802.1x interface, including an internal wireless card), or other suitable communication device(s) that allows the monitor 202 to communicate and share data with other devices. The monitor 202 can also include various other components not shown, such as a microprocessor, graphics processor, or controller to output the user interface 212, to control data communications, to compute data trending, or to perform other operations.

Although not shown in the depicted embodiment, the system 200 can include various other components or can be configured in different ways. The system 200 can also include a sensor that measures the power of light emitted from the emitter(s) 204.

Additional Considerations and Terminology

Certain categories of persons, such as caregivers, clinicians, doctors, nurses, and friends and family of a user, may be used interchangeably to describe a person providing care to the user. Furthermore, patients or users used herein interchangeably refer to a person who is wearing a sensor or is connected to a sensor or whose measurements are used to determine a physiological parameter or a condition. Parameters may be, be associated with, and/or be represented by, measured values, display icons, alphanumeric characters, graphs, gages, power bars, trends, or combinations. Real time data may correspond to active monitoring of a user, however, such real time data may not be synchronous to an actual physiological state at a particular moment. Measurement value(s) of a parameter such as any of those discussed herein, unless specifically stated otherwise, or otherwise understood with the context as used is generally intended to convey a measurement or determination that is responsive to and/or indicative of the physiological parameter.

Conditional language used herein, such as, among others, "can," "could," "might," "may," "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more embodiments necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Although certain embodiments and examples have been described herein, it will be understood by those skilled in the art that many aspects of the systems and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Any methods disclosed herein need not be performed in the order recited. The methods disclosed herein may include certain actions taken by a practitioner; however, they can also include any third-party instruction of those actions, either expressly or by implication.

Methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. The computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Various illustrative logical blocks, modules, routines, and algorithm steps that may be described in connection with the disclosure herein can be implemented as electronic hardware (e.g., ASICs or FPGA devices), computer software that runs on general purpose computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. A processor can include an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An optical physiological sensor configured to be secured to a nose of a user, the optical physiological sensor comprising:
   a first prong comprising a free end configured to be positioned proximate an outside portion of the user's nose when the optical physiological sensor is in use;
   a second prong coupled to the first prong and comprising a free end, wherein the free end of the second prong is configured to be positioned proximate an inside portion of the user's nose when the optical physiological sensor is in use;
   a winged portion coupled to the free end of the first prong and configured to contact tissue of the user when the optical physiological sensor is in use, wherein the winged portion comprises a width that is greater than a width of the free end of the second prong and wherein at least a portion of the winged portion is curved toward the second prong, thereby allowing the winged portion to conform to the outside portion of the user's nose when the optical physiological sensor is in use;
   a housing defining the entire exterior portions of the first prong, second prong, and winged portion, wherein the housing is contiguous;
   one or more emitters positioned proximate to the free end of the first prong and configured to emit light of one or more wavelengths into the tissue of the user when the optical physiological sensor is in use; and
   one or more detectors positioned proximate to the free end of the second prong and configured to detect at least a portion of the light emitted from the one or more emitters after attenuation through at least a portion of the tissue of the user's nose.

2. The optical physiological sensor of claim 1, wherein the winged portion comprises a first wing, a second wing, and an intermediate portion connecting and positioned between the first and second wings.

3. The optical physiological sensor of claim 2, wherein said width of the winged portion extends between a first end of the first wing and a second end of the second wing.

4. The optical physiological sensor of claim 2, wherein said first wing is curved toward the second prong.

5. The optical physiological sensor of claim 4, wherein said second wing is curved toward the second prong.

6. The optical physiological sensor of claim 2, wherein said intermediate portion is not curved.

7. The optical physiological sensor of claim 1, further comprising a coupling portion connecting and positioned between said first and second prongs.

8. The optical physiological sensor of claim 7, wherein said coupling portion is curved.

9. The optical physiological sensor of claim 1, wherein:
the one or more emitters and one or more detectors are positioned within an interior of the housing;
said housing comprises a first opening into said interior and a second opening into said interior, said first opening located on the winged portion and said second opening located proximate the free end of the second prong;
said first opening is configured to allow the emitted light from the one or more emitters to pass through the housing and toward said at least the portion of the tissue of the user's nose; and
said second opening is configured to allow said at least the portion of the light emitted from the one or more emitters to pass to the one or more detectors after attenuation through said at least the portion of the tissue.

10. An optical physiological sensor configured to be secured to a nose of a user, the optical physiological sensor comprising:
a first prong comprising a free end configured to be positioned proximate an outside portion of the user's nose when the optical physiological sensor is in use;
a second prong coupled to the first prong and comprising a free end, wherein the free end of the second prong is configured to be positioned proximate an inside portion of the user's nose when the optical physiological sensor is in use;
a winged portion coupled to the free end of the first prong and configured to contact tissue of the user when the optical physiological sensor is in use, wherein the winged portion comprises a width that is greater than a width of the free end of the second prong and wherein at least a portion of the winged portion is curved toward the second prong, thereby allowing the winged portion to conform to the outside portion of the user's nose when the optical physiological sensor is in use;
a housing, wherein the first and second prongs and winged portion are at least partially defined by the housing;
one or more emitters positioned proximate to the free end of the first prong and configured to emit light of one or more wavelengths into the tissue of the user when the optical physiological sensor is in use;
one or more detectors positioned proximate to the free end of the second prong and configured to detect at least a portion of the light emitted from the one or more emitters after attenuation through at least a portion of the tissue of the user's nose; and
a biasing member positioned within an interior of the housing, wherein the biasing member is configured to flex between a first position and a second position when the optical physiological sensor is secured to the user's nose, wherein said first position is associated is a neutral state of the physiological sensor, and wherein the biasing member is biased toward the first position.

11. The optical physiological sensor of claim 10, wherein the biasing member comprises:
a first end positioned adjacent the one or more emitters;
a second end positioned adjacent to the one or more detectors;
a first opening at the first end, the first opening configured to allow the emitted light from the one or more emitters to pass to the tissue; and
a second opening at the second end, the second opening configured to allow the at least the portion of the light attenuated through the tissue to arrive at the one or more detectors.

12. An optical physiological sensor configured to be secured to a nose of a user, the optical physiological sensor comprising:
a first prong configured to be positioned proximate an outside portion of the user's nose when the optical physiological sensor is in use;
a second prong coupled to the first prong and configured to be positioned proximate an inside portion of the user's nose when the optical physiological sensor is in use;
a winged portion coupled to the first prong and configured to contact tissue of the user when the optical physiological sensor is in use, wherein the winged portion extends outward from the first prong and wherein at least a portion of the winged portion curves toward the second prong;
a housing defining the entire exterior portions of the first prong, second prong, and winged portion, wherein the housing is contiguous;
one or more emitters positioned within the first prong and configured to emit light of one or more wavelengths into the tissue of the user when the optical physiological sensor is in use; and
one or more detectors positioned within the second prong and configured to detect at least a portion of the light emitted from the one or more emitters after attenuation through at least a portion of the tissue of the user's nose.

13. The optical physiological sensor of claim 12, wherein the winged portion is coupled to and extends outward from a free end of the first prong, and wherein the winged portion comprises a width that is greater than a width of the second prong.

14. The optical physiological sensor of claim 12, further comprising a coupling portion connecting and positioned between said first and second prongs, wherein said coupling portion is curved.

15. The optical physiological sensor of claim 12, wherein the first and second prongs and winged portion are at least partially defined by the housing and wherein:
the one or more emitters and one or more detectors are positioned within an interior of the housing;
said housing comprises a first opening into said interior and a second opening into said interior, said first opening located on the winged portion and said second opening located proximate the free end of the second prong;

said first opening is configured to allow the emitted light from the one or more emitters to pass through the housing and toward said at least the portion of the tissue of the user's nose; and said second opening is configured to allow said at least the portion of the light emitted from the one or more emitters to pass to the one or more detectors after attenuation through said at least the portion of the tissue.

* * * * *